June 5, 1945.　　　R. A. SCHAFER ET AL　　　2,377,720
HYDRAULIC CONTROL APPARATUS FOR MACHINE TOOLS
Filed June 8, 1940　　　12 Sheets-Sheet 1

Inventors
Robert A. Schafer
Ralph Kodal
By Williams, Bradbury & Hinkle
Attys.

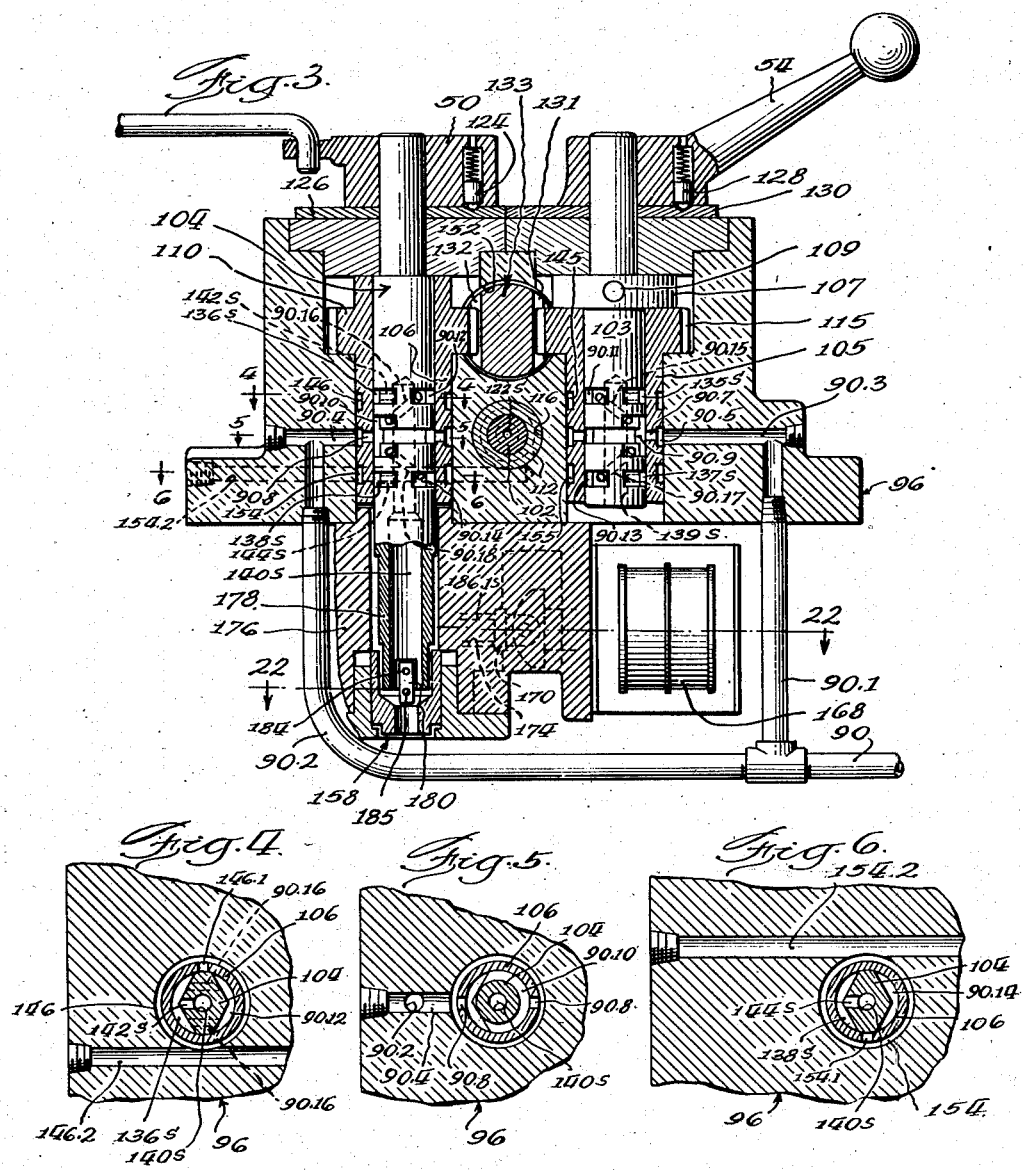

June 5, 1945.  R. A. SCHAFER ET AL  2,377,720
HYDRAULIC CONTROL APPARATUS FOR MACHINE TOOLS
Filed June 8, 1940  12 Sheets-Sheet 3
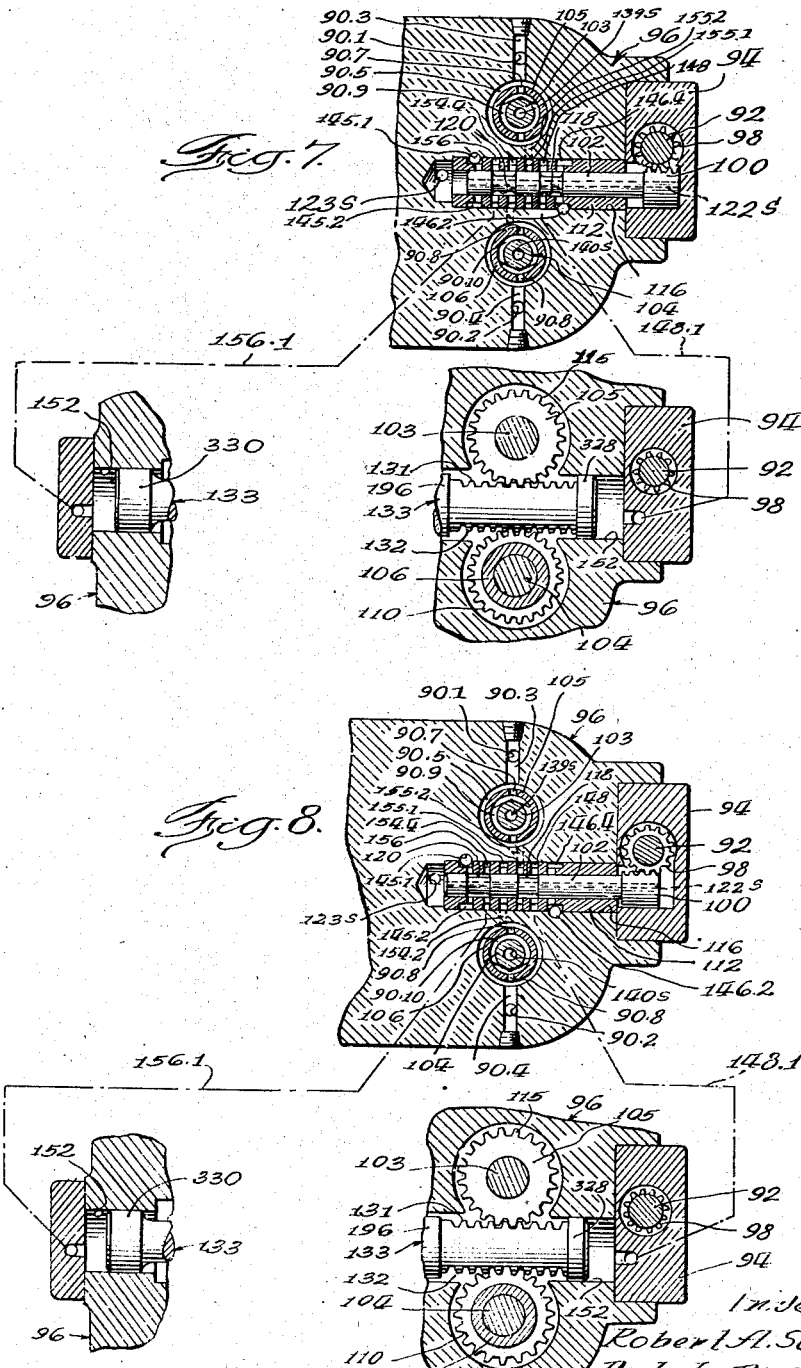

June 5, 1945.     R. A. SCHAFER ET AL     2,377,720
HYDRAULIC CONTROL APPARATUS FOR MACHINE TOOLS
Filed June 8, 1940     12 Sheets-Sheet 4
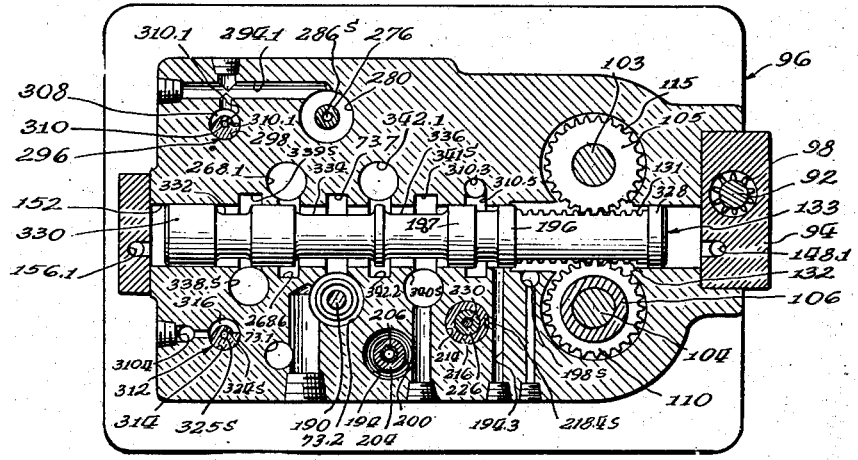
Fig. 9. Stop or Neutral.
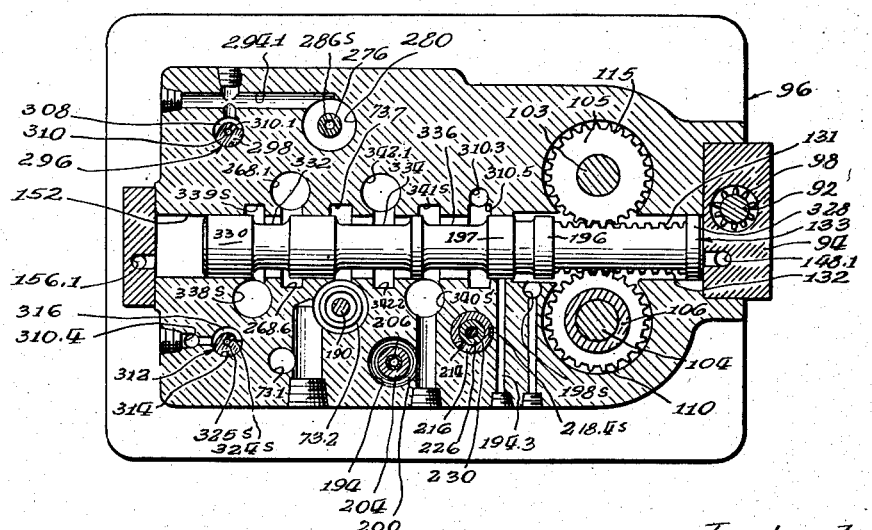
Fig. 10. Rapid Forward Traverse.
Inventors.
Robert A. Schafer
Ralph Rodal
By
Williams, Bradbury & Hinkle
Attys

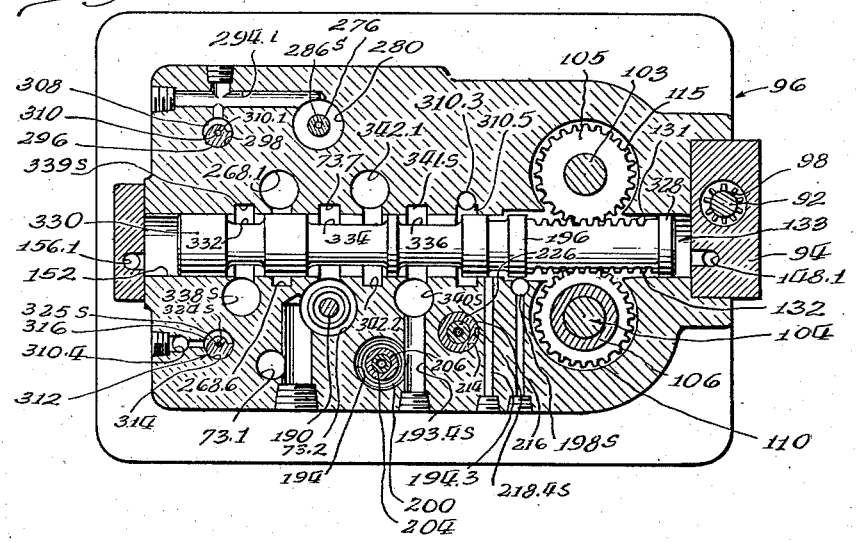
Fig. 11. Coarse Feed
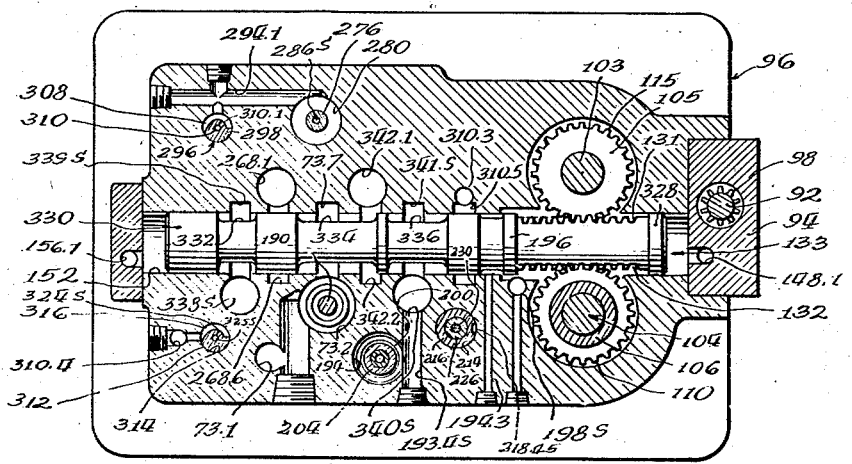
Fig. 12. Fine Feed

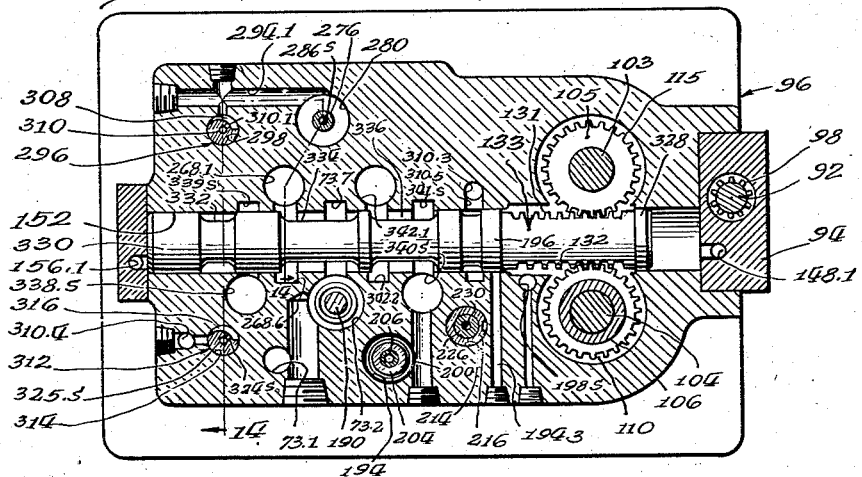
Fig. 13. Rapid Reverse Traverse
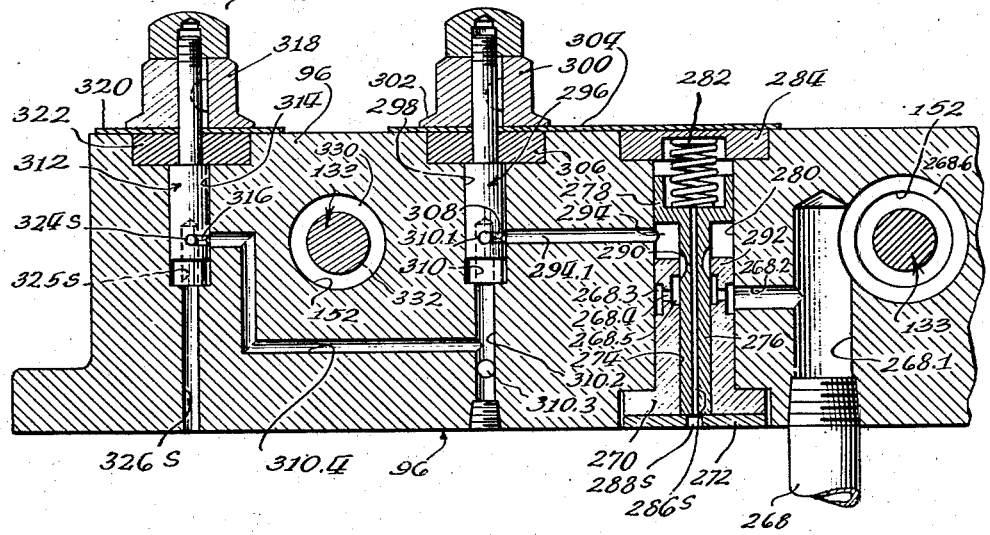
Fig. 14.
Inventor
Robert A. Schafer
Ralph Rodal
By
Williams, Bradbury & Hinkle
Attys

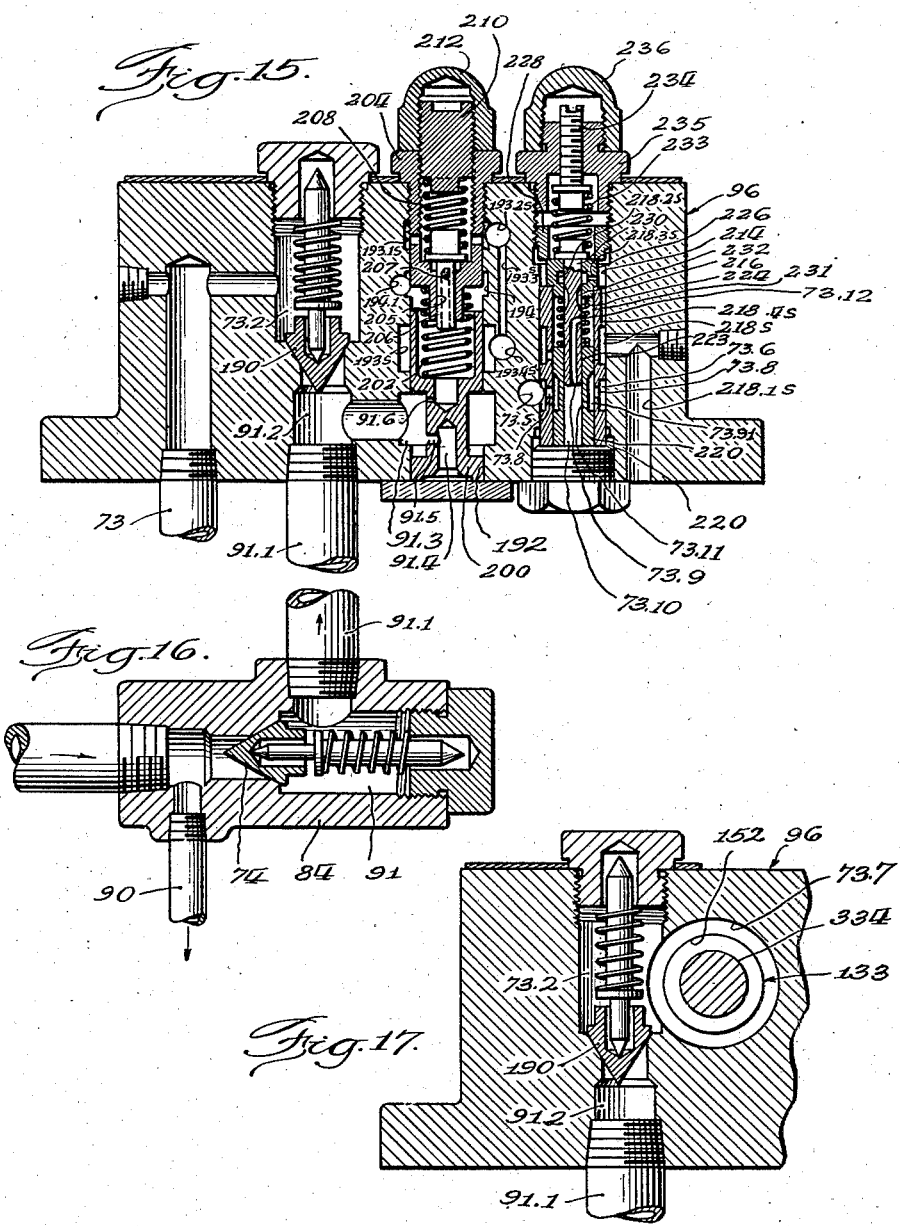

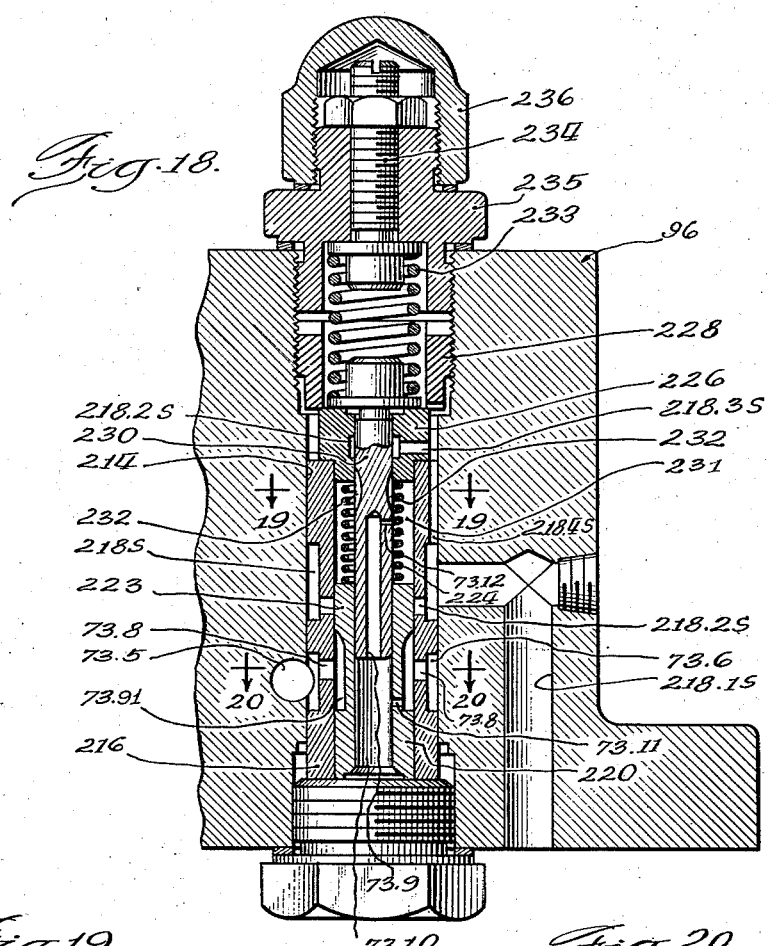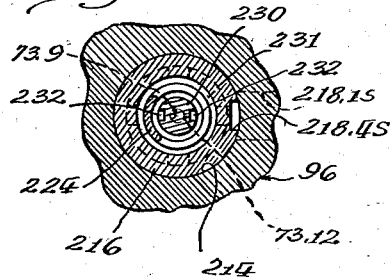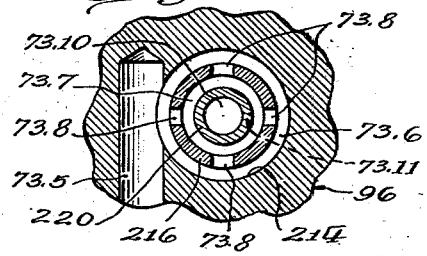

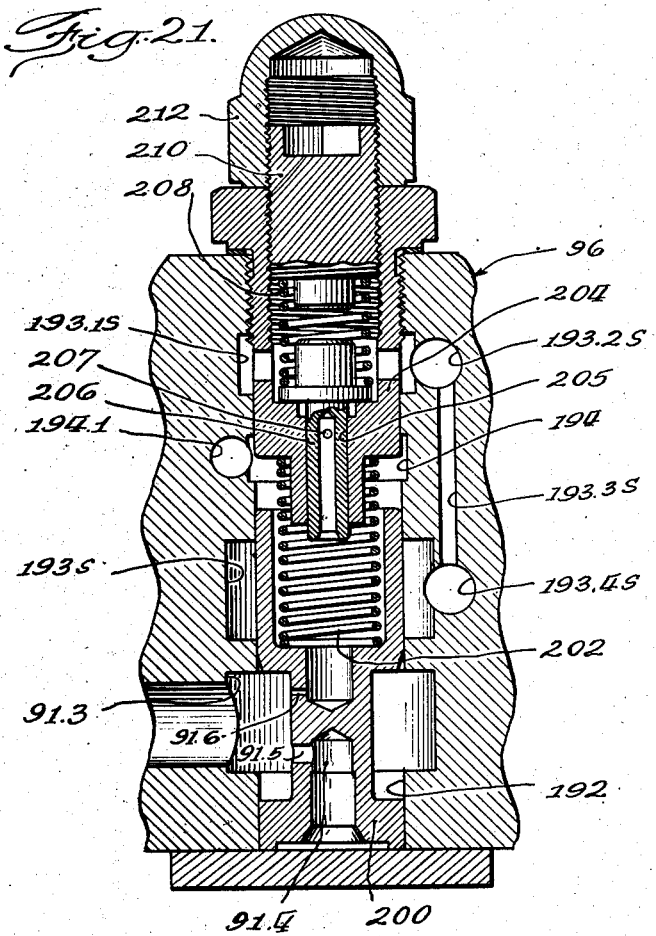

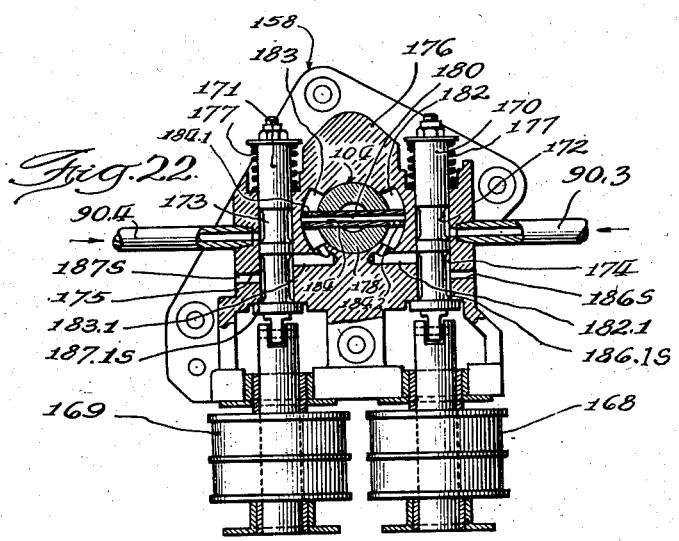
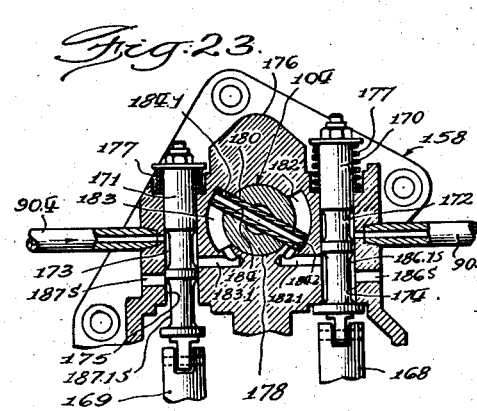
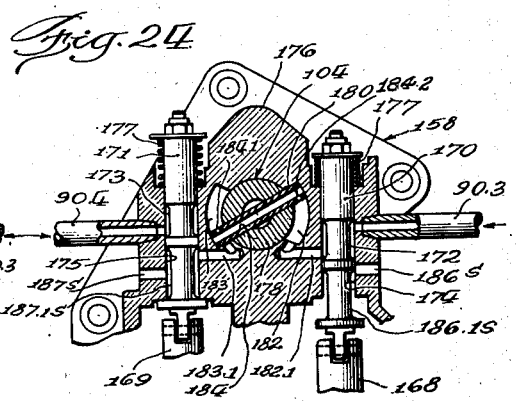
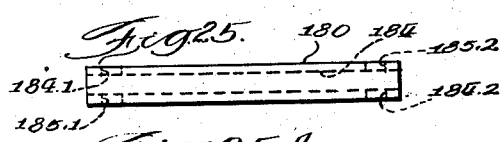
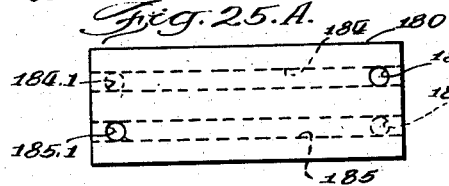

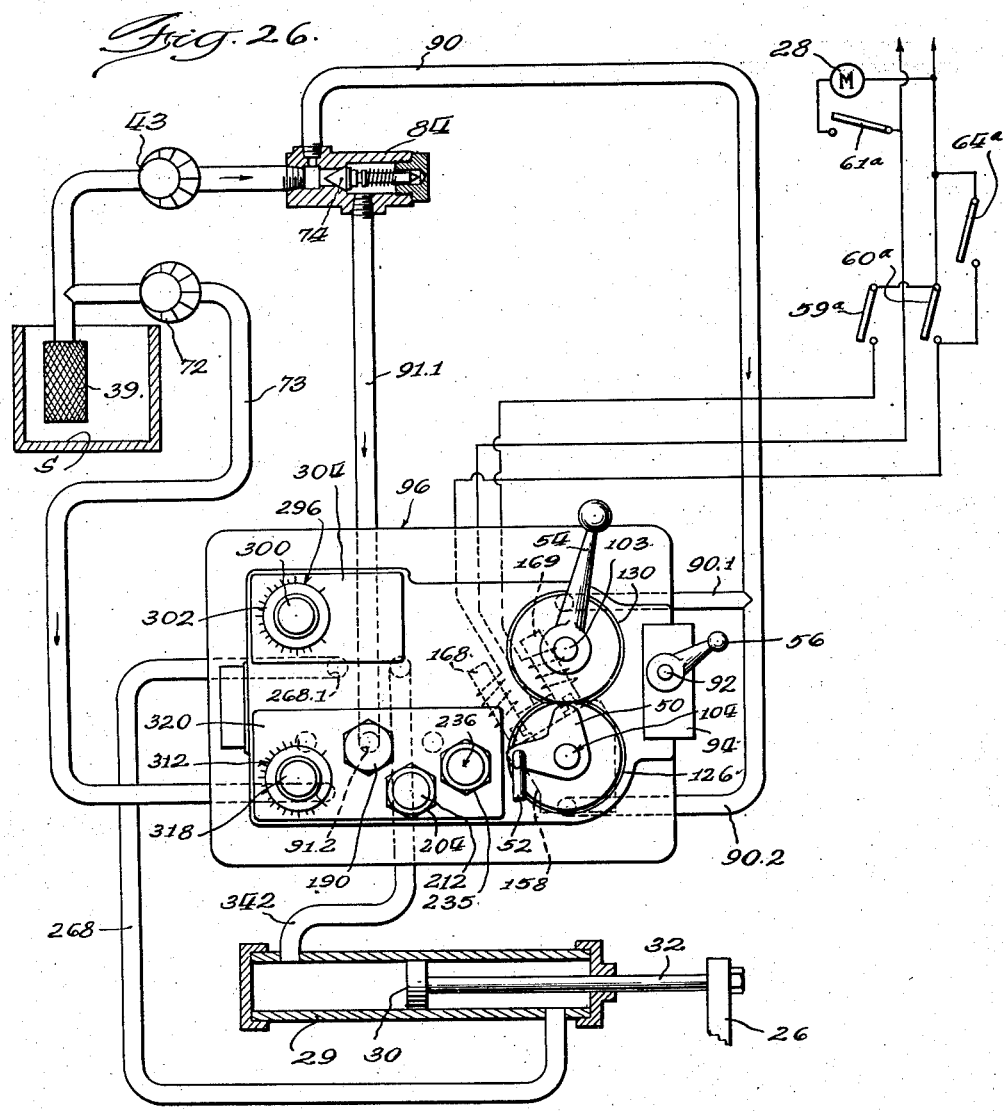

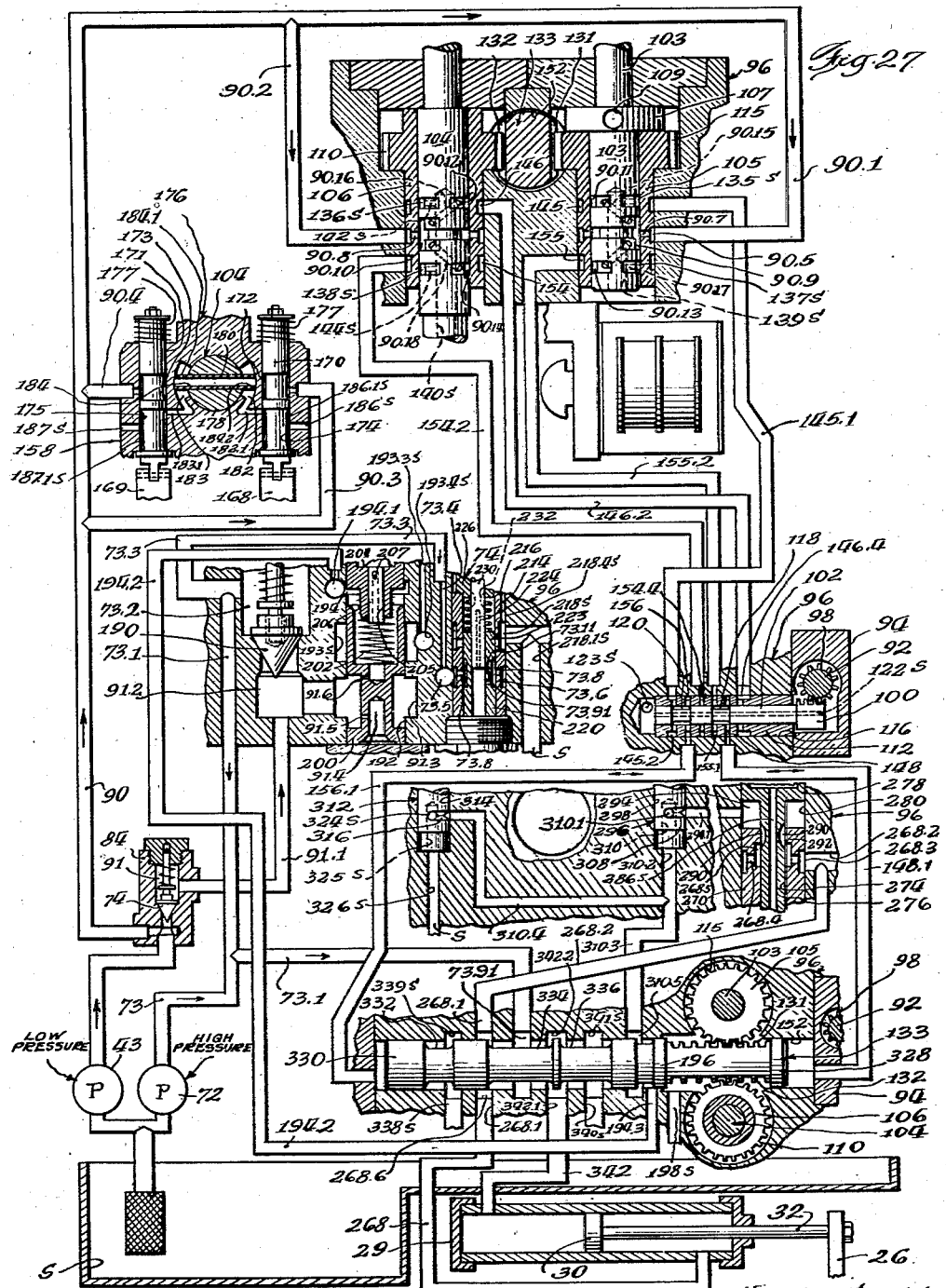

Patented June 5, 1945

2,377,720

UNITED STATES PATENT OFFICE 2,377,720

HYDRAULIC CONTROL APPARATUS FOR MACHINE TOOLS

Robert A. Schafer and Ralph Rodal, Richmond, Ind., assignors to The National Automatic Tool Company, a corporation of Indiana Application June 8, 1940, Serial No. 339,476

7 Claims. (Cl. 60—52)

Our invention relates generally to machine tools, and more particularly to improvements in hydraulic control apparatus for such tools.

The underlying principles of the hydraulic control apparatus of our invention are applicable to a large variety of machine tools, for controlling the actuation of the tools toward and from the work, or conversely, controlling the movement of the work toward and away from the tools, or may be applied to control the movement of any other part of such machine tool. In this application, our invention is, however, described as applied to the control of a horizontal unitary machine tool for performing drilling, tapping, reaming, facing, and similar operations.

In machine tools of this general type, as customarily made in the past, the tools were advanced toward the work and retracted therefrom by a hydraulic piston and cylinder actuator in which movement was caused by supplying oil under pressure to one end of the cylinder and permitting it to flow freely from the other end of the cylinder into a drain or sump. This type of actuator has a number of disadvantages as compared with our present invention, in that the machine tools, especially if performing a milling operation, tended to grab and draw the head bearing the tool toward the work at a faster rate than that determined by the rate of oil supplied to the cylinder.

In accordance with our invention, the rate of feed of the tools toward the work is determined by metering devices which control the rate at which the oil may flow from the end of the cylinder (opposite the end to which the oil under pressure is supplied) to the oil reservoir or sump. By virtue of this arrangement, the possibility of the tool pulling into the work due to the torque pull at the cut is substantially eliminated since such pulling force is resisted by the restricted flow of oil from the non-pressure end of the cylinder to the sump.

It is thus an object of our invention to provide an improved hydraulic feeding apparatus for machine tools, whereby the disadvantageous effect of having the machine tool pull into the work is substantially eliminated.

A further object is to provide a hydraulic control apparatus for machine tools in which the movement of a part of the machine is rendered uniform. Due to slight irregularities in the degree of friction between the moving part of a machine tool, such as the tool carrying head, there has been a tendency in prior devices for the movement of the head to be irregular because the head became temporarily stopped or slowed down due to increased friction on its slides and to move at an accelerated rate when the friction had been overcome and a place of lesser friction encountered. This irregular and sometimes jerky movement of the head could cause irregularities in the character of the machining operations performed, and was otherwise unsatisfactory because of the shock, noise, and excessive wear produced as a result of such jerky or irregular movement of the head.

In our invention, this possibility of irregular movement of the head is substantially completely eliminated by metering the rate at which the oil flows from the cylinder to the sump, rather than by metering the rate at which the oil under pressure flows into the cylinder.

The apparatus provides a hydraulically locked circuit, since one side of the piston is under full pump pressure, whereas, the other side of the piston is subjected to the back pressure due to the restricted flow rate of the oil therefrom to the sump.

A further object of our invention is to provide an improved hydraulic control apparatus for machine tools which is very compact and in which the necessity for a large number of pipe fittings and bends in the oil flow conduits is eliminated.

A further object is to provide a hydraulic control apparatus for machine tools in which a part of the machine tool is hydraulically actuated under the control of a directional valve which in turn may be controlled either by a hand operated pilot valve or by an automatically operated pilot valve, the pilot valves being of small dimensions and being capable of actuation by the application of small forces, thus eliminating the necessity of providing large powerful solenoids for the actuation of the control valve, and also eliminating the necessity for the use of springs. As is well understood in the art, springs in continuous use in apparatus of this character are undesirable because of the possibility of their eventual failure due to the fatigue factor. By providing easily operable pilot valves, small solenoids which readily fit into the design of the apparatus, and which are comparatively inexpensive may be utilized, and the hazard of using springs avoided.

A further object is to provide a hydraulic control apparatus for machine tools having a manually operable pilot valve for controlling the actuation of a part of the machine tool and having an automatically operated pilot valve, in which means are provided to lock the hand operated pilot control valve when the automatic pilot valve is effective and which, when the hand pilot valve is effective, positions the automatic pilot valve properly with respect to the position of the machine tool part in its cycle, so that the hand pilot valve may be rendered ineffective at any time during the cycle, whereupon the automatic pilot valve will be in proper position to control the actuation of the machine tool part through its proper cycle of operation.

A further object is to provide an improved hydraulic control apparatus for machine tools in which both automatic and manual control are possible, the manual control being particularly useful when the machine is being set up or tools are being changed, and in which means are provided for rendering the manual control inoperable whenever the automatic control is rendered effectively operable.

A further object is to provide an improved hydraulic control apparatus for machine tools in which both manual and automatic controls are provided, and in which means are provided to prevent rendering the automatic control operative unless the hand control is in neutral or stop position, so that the machine may be stopped at any time in its automatic cycle by shifting from automatic to hand control, and upon reverting to automatic control the machine may resume operation at the point in the cycle at which the hand operation was interrupted, since, during the time that the machine is being operated under hand control, the automatic control is actuated (although ineffectively) so as to be in the condition at any time to resume control at the proper point in the cycle of operation.

A further object is to provide an improved hydraulic control apparatus for machine tools in which a directional valve is employed, and in which the sequence of operations of said valve differs from the desired sequence of operations of the part controlled by the valve. It will be understood that in prior constructions it was common practice to have the directional control valve (which actually controlled the admission of oil to the actuating piston and cylinder of the part of the machine tool to be moved) move sequentially to positions which would cause the head of the machine tool to operate through the following cycle: From neutral position through rapid forward traverse, coarse feed, fine feed, stop, and reverse traverse. In this type of control, it was necessary, to initiate a new cycle, to move the directional control valve past the reverse position. This passing over of the reverse position caused a momentary reverse movement of the tool carrying head, which sometimes resulted in an abrupt jar of the head, with consequent noise and wear upon the parts.

In the construction of the present invention, the directional valve moves from neutral or stop position through fine feed and coarse feed to rapid traverse forward, then successively to coarse feed forward, fine feed forward, passing over stop or neutral, rapid traverse reverse, and finally returning to neutral or stop position.

To reach the rapid traverse reverse position, the directional valve must pass over the neutral or stop position, and then be brought back to the neutral position to stop the reverse traverse. Thus, in initiating a new cycle, it is not necessary for the directional control valve to move through the reverse traverse position in order to reach the forward traverse position.

A further object is to provide an improved form of hydraulic pilot valve controlled apparatus.

A further object is to provide an improved hydraulic control apparatus for machine tools which is very compact in construction, composed of a few moving parts, which is easily adjusted and regulated, and which may be inexpensively manufactured.

A further object is to provide an improved hydraulic control apparatus formed in a unitary assembly in which substantially all of the working parts are readily accessible from the outside of the unit without completely dismantling it, for inspection and service.

It is an object of our invention to provide an improved hydraulic control apparatus for machine tools in which the valve utilized to initiate a particular operation of the machine tool may be very small and easily operated and will be effective, through a series of valves, to control the application of large hydraulic forces for the movement of parts of the machine tool.

A further object is to provide an improved hydraulic control apparatus for machine tools utilizing two sources of fluid pressure, one being a high pressure low volume source and the other being a low pressure high volume source, and applying the hydraulic pressure from said sources to the hydraulically operated parts of the machine tool in a manner such that the high pressure low volume source will be used for feeding operations, while both low pressure high volume source and the high pressure low volume source will be used to operate the machine tool upon rapid forward and rapid reverse traverse operations when the resistance to movement of the machine tool part is low, and the speed of movement of such part should be high.

A further object is to provide an improved controlling governor valve.

A further object is to provide an improved pressure relief valve which is operable to relieve the pressure at the different values, depending upon the position of an operating cycle controlling valve.

A further object is to provide an improved valve-operating oscillatory hydraulic motor.

A further object is to provide an improved hydraulic control mechanism for machine tools which is simple in construction, reliable in operation, and may be economically produced.

Further objects will appear from the following description, reference being had to the accompanying drawings, in which:

Figure 3 is a transverse sectional view taken on the line 3—3 of Figure 2;

Figure 1:
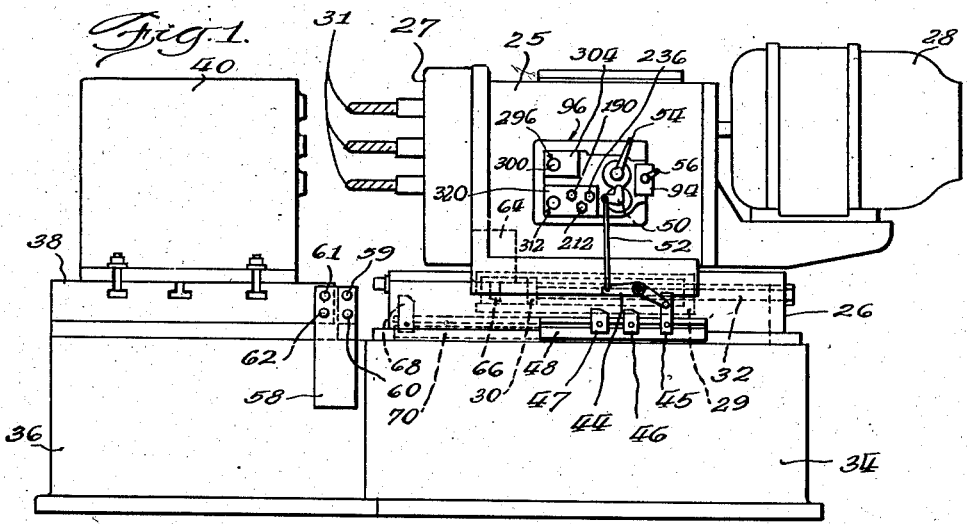
Figure 1 is a side elevational view of an exemplary machine tool embodying the hydraulic control of our invention.

Figures 4, 5, and 6 are fragmentary sectional views taken on the lines 4—4, 5—5, and 6—6, respectively, of Figure 3;

Figure 7 is a fragmentary sectional view of the throw-over valve, together with fragmentary portions of the directional valve, the throw-over valve being shown in position for control by the automatic pilot valve;

Figure 8 is a view similar to Figure 7 with the throw-over valve in position for control by the manually operated pilot valve;

Figures 9, 10, 11, 12, and 13 are vertical sectional views showing the directional valve, respectively, in the stop or neutral position, in the rapid forward traverse position, in the coarse feed position, in the fine feed position, and in the rapid reverse traverse position;

Figure 14 is a developed sectional view taken on the line 14—14 of Figure 13;

Figure 15 is a developed sectional view taken substantially on the line 15—15 of Figure 1;

Figure 16 is a sectional view of the pressure maintaining valve;

Figure 17 is a sectional view through the low pressure check valve showing its connection with the main control or directional valve;

Figure 18 is a full size sectional view through the high pressure relief valve;

Figures 19 and 20 are transverse sectional views of the high pressure relief valve taken on the lines 19—19 and 20—20 of Figure 18;

Figure 21 is a full size sectional view through the longitudinal center of the low pressure relief valve;

Figure 22 is a fragmentary transverse sectional view of the hydraulic motor for operating the automatic pilot valve, the parts thereof being shown in neutral position;

Figures 23 and 24 are views similar to Figure 22 showing the parts in the position assumed during rapid forward traverse and during rapid reverse traverse respectively.

Figures 25 and 25A are end elevational and side elevational views of the vane of the hydraulic motor shown in Figures 3, 22, 23, and 24;

Figure 26 is a diagrammatic view showing the complete system and circuits for the operation of the solenoids; and, Figure 27 is a simplified diagram of the complete hydraulic system showing in a general way the operating relationship between the various parts of the system.

General description

In order that the necessarily rather complicated and detailed description of the invention may be more readily followed, it is preceded by this brief general description of the machine tool and the hydraulic control apparatus therefor.

Figure 2:
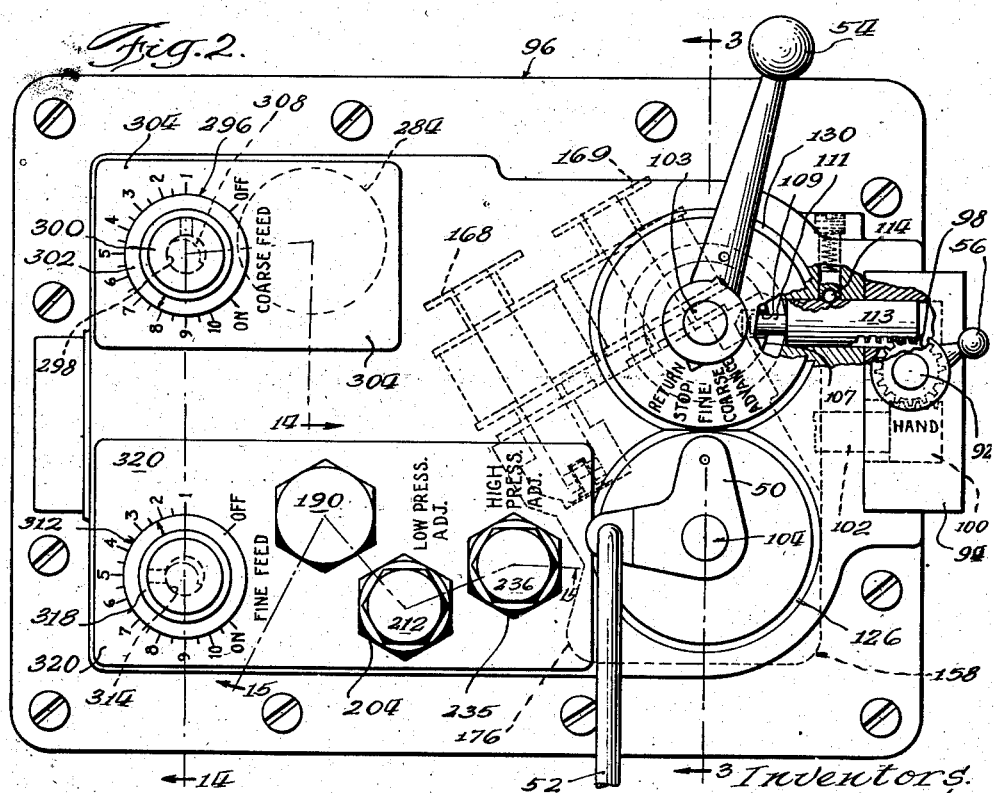
Figure 2 is an elevational view of the hydraulic control panel.

Referring particularly to Figs. 1, 2, and 26, our invention is illustrated as applied to an automatic drilling machine comprising a self-contained unit consisting of a housing 25 which is mounted to slide on a stationary sub-base 26. The housing is hollow so as to form a reservoir or sump S and includes a tool carrying head 27, a high pressure low volume pump 72, and a low pressure high volume pump 43, the inlets of which are suitably connected to a strainer 39 located near the bottom of the sump S. The pumps 72 and 43 as well as the tools 31 are driven by an electric motor 28.

A hydraulic feed cylinder 29 is rigidly secured to the housing 25 and has a piston 30 carried by a piston rod 32 which is rigidly secured to a portion of the sub-base 26. The sub-base 26 is suitably secured to the machine base 34 which may be formed integrally with or may be secured to a work supporting base 36 having a table 38 formed integrally with or secured thereto. A piece of work 40 upon which the drills 31 are to operate is illustrated as being bolted to the table 38. The control unit 96 is mounted upon the side of the housing 25, covering an opening formed in the latter, and comprises a lever 44 which is suitably pivoted on a downwardly projecting portion of the housing 25 and the right-hand arm of which is adapted to contact seriatim with dogs 45, 46, and 47, which are adjustably secured upon a support 48, which is rigidly secured to the sub-base 26. The top cam surfaces of the dogs 45, 46, and 47 are at unequal elevations so that as the housing 25 moves with respect to the sub-base 26, the lever 44 will be pivoted through an angle determined by the height of the tops of the dogs 45, 46, and 47.

The left-hand arm of the lever 44 is operatively connected with an arm 50 by a rod 52, the arm 50 being connected to the automatic pilot valve, as will hereinafter be described in detail.

A manually operable handle 54 is connected to the hand pilot valve, and a handle 56 is connected to a throw-over valve and locking mechanism by which the automatic pilot valve and the hand pilot valve may be alternatively rendered ineffective, and by the operation of which the hand pilot valve may be locked in position when the automatic pilot valve is rendered effective to control the operation of the machine.

A panel 58 is secured to the work piece base 36 and carries four push buttons 59, 60, 61, and 62, which operate electric switches. Push button 59 operates to close a switch 59a (Fig. 26) which re-sets the hydraulic control unit to initiate a cycle of the tool head, while the push button 60 closes a switch 60a (Fig. 26) to close and thereby to initiate a rapid reverse traverse operation of the machine tool head. Push button 61 starts the electric motor 28, while push button 62 stops this motor by the use of a suitable switch mechanism.

Upon the opposite side of the housing 25 is a limit switch 64 which is secured to the housing and has a switch actuator 66 which is engageable with a dog 68 adjustably positioned upon a rail 70 secured to the sub-base 26. The limit switch 64 includes a contact arm 64a (Fig. 26), which, it will be noted, is connected in parallel with the switch 60a.

Referring now to the diagrammatic view of Figs. 26 and 27, it will be noted that the low pressure pump 43 draws the operating fluid, which will hereinafter be referred to as oil, from the sump S and delivers it under pressure to a pressure maintaining valve body 84 having a spring-pressed valve 74 which may be designed to open at a pressure in the order of 50 pounds per square inch. A conduit 90 is connected to the valve body 84 so as to be supplied with oil at the pressure at which it is maintained in the T.

The chamber 91 behind the check valve 74 is connected by a conduit 91.1 to a valve chamber 91.2. Generally speaking, the oil supplied through the conduit 91.1 is provided for the actuation of the cylinder and piston 29, 30 during rapid forward and rapid traverse operation of the latter, while the oil supplied through the conduit 90 is provided for the actuation of the pilot and directional valves and the hydraulic motor for operating the pilot valve. The valve 74 is effective to maintain a pressure differential (of approximately fifty pounds per square inch) between the pressures in conduits 90 and 91.1, so that sufficient pressure will always be available for the operation of the pilot and directional valves.

A high pressure low volume pump 72 likewise draws oil from the sump S and discharges it under pressure (of approximately five hundred pounds per square inch) through a conduit 73, which, as will be described hereinafter, is connected by conduit 73.3 to a high pressure relief valve by which the pressure in the conduit is maintained, and is connected by a conduit 73.1 through the directional valve to supply oil for operating the cylinder and piston 29, 30 during coarse feed and fine feed portions of the operating cycle.

In the foregoing paragraph, and in the following detailed description of the invention, in order to facilitate following the hydraulic circuits, all passageways, conduits, ports, and the like, which are in communication with each other at all times, so that irrespective of the phase of the operating cycle, oil could flow from one to another, will be given the same reference character followed by decimals to distinguish individual parts. Thus, for example, when it is stated that oil under pressure flows into a conduit bearing a certain reference character, it will be understood that oil in all parts, bearing that reference character followed by a decimal fraction, will likewise be under pressure.

Similarly, all passageways, etc., through which oil is at all times free to discharge to the sump will be followed by the letter S, which should be interpreted to mean, "from which the oil may flow freely to the sump."

Hand to automatic throw-over valve

As previously stated, the apparatus of our invention may be manually controlled, or may be automatically controlled. There is thus a hand operable pilot valve and an automatically operated pilot valve, the pilot valves being generally similar and each being capable of controlling the position of the directional valve. The means for determining which of these two pilot valves shall control the operation of the directional valve consists of a throw-over valve which is operated by the handle 56. The handle 56 is suitably secured to a stub shaft 92 which is journaled in an end block 94 suitably secured to the main panel 96. As shown in Figs. 7 and 8, the lower end of the stub shaft 92 has pinion teeth 98 formed thereon for engagement with a rack 100 formed on the throw-over valve 102. The throw-over valve 102, when in the position in which it is shown in Fig. 7, renders the hand pilot valve inoperative, and when in the position shown in Fig. 8 renders the automatic pilot valve inoperative.

As shown in Fig. 3, the handle 54 is connected to a hand pilot valve 103, the hand pilot valve being surrounded by a follower sleeve valve 105 and having a portion 107 of increased diameter provided with a hole 109 to receive a locking pin 111 formed at the end of a rack 113 which is engageable with the pinion teeth 98 formed on the stub shaft 92. A spring pressed detent 114, engageable with notches formed in the rack 113, is adapted to hold the rack in either of its extreme positions with the locking pin 111 in engagement with the hole 109 or free from engagement therewith. By virtue of this construction, when the throw-over lever 56 is shifted to its upper (Fig. 2) or automatic position, the hand pilot valve lever 54 is locked in position.

The throw-over valve 102 cooperates with a ported sleeve 112 which is pressed into a bore 116 in the panel 96 and has a plurality of ports, hereinafter to be described in detail, some of which may be interconnected by annular passageways 118 and 120 formed in the throw-over valve 102. The throw-over valve has an axially drilled hole 122S extending from end to end thereof to permit flow of oil whenever this valve is shifted, the end of the bore 116 being in communication with the sump through a passageway 123S.

Hand and automatic pilot valves

The conduit 90 (Fig. 26) has two branches 90.1 and 90.2 which supply oil under pressure to the hand and automatic pilot valve through ducts 90.3 and 90.4, respectively. The automatic pilot valve 104 is secured to the arm 50, a spring pressed detent 124 being engageable in notches formed in a plate 126 so as to hold the arm 50 in the position to which it is moved by the dogs 45, 46, 47. The handle 54 has a similar detent 128 engageable with recesses formed in the plate 130.

The automatic pilot valve 104 has a follower sleeve valve 106, having a pinion 110 formed integrally therewith, the corresponding hand follower sleeve valve 105 having a similar pinion 115 formed integrally therewith, the pinions 110 and 115 meshing with a pair of racks 132 and 131 formed on a directional valve 133, which will be described in further detail hereinafter, the present consideration being that the follower sleeve valves 105 and 106 always move through corresponding angular distances by virtue of the fact that each is geared to the directional valve 133.

The sleeve valve 105 has an annular port 90.5 which, through ports 90.7, communicates with a chamber 90.9 formed by milling away portions of the pilot valve 103. Chambers 90.11 and 90.13 communicate with the chamber 90.9 through pairs of ducts 90.15 and 90.17, respectively, while chambers 135S and 137S are formed in the pilot valve 103 and communicate with a drain duct 139S.

In a similar manner, the automatic pilot valve 104 has a chamber 90.10 which communicates with the drilled passageway 90.4 through ports 90.8, the chamber 90.10 communicating with chambers 90.12 and 90.14 through pairs of ducts 90.16 and 90.18, respectively. Chambers 136S and 138S formed in the valve 104 communicate with an axially drilled passageway 140S through ports 142S and 144S, respectively, as shown in Figs. 4 and 6.

The chamber 90.10 is of the irregular shape illustrated, so that the hydraulic pressure exerted upon the walls of this chamber will be exactly balanced by the hydraulic pressure exerted upon the walls of chambers 90.12 and 90.14. The pilot valve sleeve 106 has an external annular groove 146 which communicates with a cross drilled passageway 146.2 which leads to an annular groove 146.4 (Figs. 7 and 8) formed in the ported sleeve 112 of the throw-over valve 102. From the groove 146.4 the oil may flow through the annular passageway 118 (when the throw-over valve is in the automatic position, as shown in Fig. 7) to an annular groove 148 which, through a duct represented by the dot-dash line 148.1, communicates with the right-hand end (Fig. 7) of directional valve cylinder 152. It will be noted from Fig. 8 that oil cannot escape from the passageway 146.2 when the throw-over valve 102 is shifted to the hand control position.

The follower sleeve 106 of the automatic pilot valve has an annular groove 154 which, as shown in Fig. 6, is in communication with a cross drilled duct 154.2, the duct 154.2 leading to an annular passageway 154.4 formed in the throw-over valve sleeve 112, the annulus 154.4 being connected with a similar annular groove 156 and a suitable passageway represented by the dot-dash line 156.1 with the left-hand end of directional valve cylinder 152.

In a similar way, the chambers 135S and 137S communicate with the axially drilled hole 139S of the hand pilot valve 103, and the hand pilot sleeve valve 105 has an annular passageway 145 which communicates with a passageway 145.1 leading to an annular passageway 145.2 formed in the sleeve 112 of the throw-over valve 102. An annulus 155 formed in the manual pilot valve sleeve 105 communicates with an annulus 155.1 in the throw-over valve sleeve 112 through a cross drill hole 155.2. Thus, when the throw-over valve is shifted to the hand position, as shown in Fig. 8, the annulus 155.1 communicates through the annular passageway 118 on the throw-over valve 102 with the annulus 148, the latter being in communication with the right-hand end of directional valve cylinder 152 through the duct 148.1.

Similarly, when the throw-over valve is in hand control position, as shown in Fig. 8, the annulus 145 communicates, through cross drilled hole 145.1, annulus 145.2, annular passageway 120 of the throw-over valve, with annulus 156, and hence through conduit 156.1 with the left-hand end of the directional valve cylinder 152.

It will be noted from Fig. 4 that the section of the automatic pilot valve 104 between chambers 90.12 and 136S is a generally diamond shape, to form a slide valve with respect to port 146.1 formed in the valve sleeve 106. Similarly, the section of the pilot valve 104 between the chambers 90.14 and 138S is such as to form a cut-off valve for a port 154.1 formed in the sleeve 106. The sleeve 105 of the manual pilot valve 103 has ports corresponding with the ports 146.1 and 154.1.

The automatic pilot valve is adapted to be operated by a hydraulic motor (designated generally by the reference character 158 and shown in detail in Figs. 22 to 25A) controlled by solenoids which in turn are controlled by the switches 58a, 60a, and 64a, as will be more fully described hereinafter.

Disregarding for a moment the functions of the directional control valve 133, the hydraulic circuits by which this control valve may be shifted will now be described. It will be understood that the directional valve 133 (see, for example, Fig. 11) forms a freely sliding piston in its cylinder 152. The sole purpose of the pilot valves is to move the directional valve 133 rapidly to any one of its five positions, which are: (a) stop, or neutral; (b) fine feed; (c) coarse feed; (d) rapid forward traverse; and (e) rapid reverse traverse.

These five positions of the directional valve are shown in Figs. 9, 12, 11, 10, and 13, respectively.

Assuming that the directional valve is in its stop or neutral position, and that the automatic pilot valve 104 is moved clockwise (Figs. 2 and 26) by its hydraulic motor 158, the resulting operations of the pilot valve will take place substantially continuously, but will be described herein as if they took place in a series of separate steps. As soon as the pilot valve 104 starts to move clockwise, the ports 146.1 and 154.1 in the pilot valve sleeve 106 will be uncovered. As a result, oil under pressure in the chamber 90.14 will flow through the port 154.1, annulus 154, cross drilled duct 154.2, to the annulus 154.4 of the throw-over valve sleeve (and assuming that the throw-over valve 102 is in the automatic position of Fig. 7) through the annular passageway 120 of the throw-over valve and hence to the annulus 156 of the throw-over valve sleeve and passageway 156.1 to the left-hand end of the directional valve cylinder 152. At the same time, the oil from the right-hand end of the directional valve cylinder 152 flows through the conduit 148.1, through the annulus 148, annular passageway 118 of the throw-over valve, annulus 146.4 of the throw-over valve sleeve, cross drilled duct 146.2, annulus 146 of the pilot valve sleeve 106, port 146.1, and hence to chamber 136S. Oil under pressure is thus supplied to the left-hand end of the directional valve 133 and permitted to flow to the sump from the right-hand end thereof. The directional valve 133 thus moves to the right (Fig. 7) and by this movement through its rack 132 rotates pinion 110 clockwise.

Clockwise movement of the pinion 110 and consequent clockwise movement of the pilot sleeve 106 results in closure of the ports 146.1 and 154.1, thereby cutting off the supply of pressure to the left-hand end of the directional valve cylinder 152, and likewise cutting off the connection to the sump from the right-hand end of the directional valve cylinder. Thus, any clockwise movement of the pilot valve 104 will immediately result in movement of the directional valve and consequent movement of the pilot valve sleeve 106 in a clockwise direction until the pilot valve 104 and sleeve 106 are in the same relative positions as these parts are shown in Figs. 3 to 6 inclusive.

In a similar manner, rotation of the pilot valve 104 in a counter-clockwise direction results in a corresponding angular movement of the pilot valve sleeve 106 and leftward displacement of the directional valve 133.

The hydraulic circuits which cause the latter operation upon counter-clockwise movement of the pilot valve 104 will now be described. Oil under pressure supplied through the port 90.8 flows through the chamber 90.10 and passageways 90.16 to cahmber 90.12, through the now uncovered port 146.1, annulus 146, cross drilled duct 146.2 to annulus 146.4 of the throw-over valve, annular passageway 118 of the throw-over valve 102, annulus 148, duct 148.1 to the right-hand end of the directional valve cylinder 152, thus applying pressure to the directional valve, causing its movement toward the left. The oil from the left-hand end of the cylinder 152 flows outwardly through the duct 156.1, annulus 156 of the throw-over valve sleeve, annular passageway 120 formed in the throw-over valve 102, annulus 154.4, duct 154.2, annulus 154, into the then uncovered port 154.1 and chamber 138S. As the result of the leftward movement of the directional valve 133, the pilot valve sleeve 106 will be rotated counter-clockwise, and thus follow the movement of the pilot valve 104 until the ports 146.1 and 154.1 are again closed by the pilot valve 104.

From the foregoing, it will be seen that when the pilot valve 104 is moved any angular distance in either direction, such movement is immediately followed by equal angular movement of the pilot valve sleeve 106 and proportional movement of the directional valve 133. In this way, by the application of a relatively small torque to the pilot valve 104, relatively large forces may be hydraulically applied to the directional valve 133 for the shifting of the latter, and the control is such that the directional valve 133 follows substantially instantaneously, and in very accurate proportionality, the movement of the pilot valve.

The hydraulic circuits which are completed when the throw-over valve is in the hand control position, as illustrated in Fig. 8, will now be described. It will be noted from Fig. 8 that the throw-over valve 102 cuts off communication from the ducts 146.2 and 154.2 which lead to the automatic pilot valve. In addition, it puts the duct 145.1 in communication with the duct 156.1 and puts the duct 155.2 in communication with the duct 146.1. It will be noted that the ducts 145.1 and 155.2 correspond respectively with the ducts 146.2 and 154.2 of the automatic pilot valve. Thus, when the throw-over valve is in the hand position shown in Fig. 8, the hand pilot 103 and its sleeve 105 will operate in the same manner as above described with reference to the pilot valve 104 and its sleeve 106, to control the shifting of the directional valve 133. Since the operation of these parts under hand control corresponds exactly with their operation under the control of the automatic pilot valve, it is believed that it is unnecessary to repeat the details of the hydraulic circuits by which the shifting of the directional valve is accomplished under the control of the hand pilot valve 103 and its sleeve 105.

Hydraulic pilot valve motor

Referring particularly to Figs. 3 and 22 to 25A, the hydraulic motor 158 for operating the automatic pilot valve 104 to shift the directional valve 133 either to its rapid reverse traverse position (shown in Fig. 13) or to its rapid forward traverse position (shown in Fig. 10) is controlled by solenoids 168 and 169, which, as shown in Fig. 26, are adapted to be energized upon the closure of switches 60a and 59a respectively. The solenoid 168 may also be energized by closure of the limit switchc 64a. The plungers of solenoids 168 and 169 are operatively connected to cylindrical slide valves 170 and 171 respectively, these valves being provided with annular grooves 172 and 173 respectively, and are slidable in bores 174 and 175 respectively formed in a hydraulic motor casting 176. These valves are urged to their retracted position (upon deenergization of their respective solenoids) by compression coil springs 177. Branches 90.3 and 90.4 from the conduit 90 lead to the valve cylinders 174 and 175 respectively to furnish the operating fluid for the motor.

The motor is of the oscillatory vane type and comprises a hollow cylindrical extension 178 of the automatic control valve 104, the lower end of this extension 178 being slotted to receive a vane 180, the ends of which project into arcuate chambers 182 and 183, which are in communication with ports 182.1 and 183.1 respectively. As best shown in Figs. 25 and 25a, the vane 180 is generally rectangular in cross section, and has a pair of passageways 184 and 185 extending longitudinally therethrough. The passageway 184 has ports 184.1 and 184.2 in the opposite faces of the vane, while the passageway 185 has similar but oppositely facing ports 185.1 and 185.2 formed therein. Thus, irrespective of the position of the vane 180, the diametrically opposite portions of the chambers 182, 183 are always in communication with each other. As a result, hydraulic forces which are exerted upon the ends of the vane 180 result in applying solely a turning couple (or torque) to the automatic pilot valve 104.

The valves 170 and 171 are normally in the positions in which they are shown in Fig. 22, in which case the chambers 182 and 183 are both at atmospheric pressure due to the connection of their passageways 182.1 and 183.1 with ports 186S and 187S through annular grooves 186.1S and 187.1S formed on the valves 170 and 171 respectively. Thus, under these conditions, the valve 104 is free to rotate in either direction under the control of the dogs 44, 45, 46, and 47.

When the solenoid 168 is energized, as occurs when the "stop" push button 60 is operated or the limit switch 64a is operated by the dog 66 (when the head reaches the forward limit of its stroke), the slide valve 170 will be moved to the position in which it is shown in Fig. 24. When in this position, oil under pressure will flow through the conduit 90.3 around the annular groove 172 of the valve 170, through the passageway 182.1, into the adjacent end of chamber 182 and to the far end of chamber 183 through the port 184.2, passageway 184, and port 184.1. The far end of chamber 182, through port 185.2, passageway 185, and port 185.1 will be connected to the portion of chamber 13 nearest its passageway 183.1, thence around the annular groove 187.1S. Due to this differential pressure upon the opposite sides of the end portions of the vane 180, it will rotate the automatic pilot valve 104 counter-clockwise to the position in which it is shown in Fig. 24. Such counter-clockwise movement of the automatic pilot valve 104 results in movement of the directional control valve to its left-most position (Fig. 13), which, as previously mentioned, causes rapid reverse traverse of the machine tool head.

Similarly, when the push button 59 is pressed to start an automatic cycle, the closure of its switch 59a results in the energization of the solenoid 169. Energization of this solenoid will move its slide valve 171 to the position in which it is shown in Fig. 23, thereby causing the automatic pilot valve 104 to rotate clockwise to the position in which it is shown in Fig. 23, this operation taking place in a manner similar to that above described with reference to Fig. 24 upon the energization of solenoid 168.

Clockwise rotation of the automatic pilot valve 104 to its extreme clockwise position, shown in Fig. 23, results in moving the directional control valve 133 to its right-most position, in which it is shown in Fig. 10, with the result, as previously indicated, that the rapid forward traverse portion of the cycle is initiated.

Low pressure relief valve

As previously mentioned, the low pressure pump 43 supplies oil under pressure past the pressure maintaining valve 74 to the conduit 91.1 and hence to the chamber 91.2. The end of this chamber 91.2 is closed by a spring-pressed check valve 190 which prevents flow of oil from the mixing chamber 73.2 to the chamber 91.2. This check valve permits the discharge of the low pressure pump 43 to mix with that of the high pressure pump 72 whenever the pressure in the conduit 73 drops appreciably below that in conduit 91.1, as will usually occur during the rapid forward or rapid reverse traverse portions of the operating cycle. Thus the output of both pumps is utilized during those portions of the cycle which do not require high pressure in the cylinder 29.

The chamber 91.2 is in free communication with an annular groove 91.3 formed in a bore 192 for the low pressure relief valve. As best shown in Figs. 15 and 21, this low pressure relief valve bore 192 has additional annular grooves 193S, 193.1S which are connected by passageways 193.2S, 193.3S, and 193.4S.

The bore 192 has a fourth annular groove 194 which is connected by a passageway 194.1 and a conduit 194.2 with a port 194.3 (Figs. 9 to 13 and 27) formed in the directional valve casting. As will be apparent from Figs. 9 to 13, port 194.3 is closed by a land 197 on the directional valve 133 during the rapid forward traverse and by the adjacent land 196 during the rapid reverse traverse portions of the cycle. However, during the coarse feed and fine feed portions of the cycle (Figs. 11 and 12), this port is in communication with a passageway 198S.

A valve member 200 is freely reciprocable in the inner end of the bore 192, its lower end being subjected to pressure through an axial passageway 91.4 which is connected to the annular groove 91.3 by a port 91.5. Outward movement of the valve member 200 under the pressure thus exerted against its inner end is resisted by a spring 202, the outer end of which abuts against a plug member 204 which is threaded in the outer end of the bore 192. Within the plug 204 is an axial passageway 205 which forms a guide for a poppet valve 206 which is pressed inwardly by a compression coil spring 208, the degree of compression of which may be varied by adjustment of a plug 210 threaded in the member 204 and locked in position by a cap nut 212. The annular chamber 91.3 is in communication with the interior of the valve 200 through a small throttling port 91.6 so that oil pressure is exerted upon the inner end of the poppet valve 206.

It will be understood that under normal circumstances, the opposite ends of the valve 200 will be subjected to the same pressure due to the communication port 91.6 so that the valve 200 is readily maintained in closed position by the spring 202. However, when the pressure in the annular chamber 91.3 rises above a predetermined value, the poppet valve 206 will be moved outwardly against the force of the spring 208 until its port 207 is uncovered, thus permitting rapid escape of the oil from the space above the valve 200, since the annulus 193.IS is substantially at atmospheric pressure. The port 207 is considerably larger than the port 91.6, and as a result, the pressure on the outer end of the valve 200 will be reduced so that the oil pressure on the inner end of the valve 200 will move this valve outwardly to open a path of communication between the annular chambers 91.3 and 193S, thus relieving the pressure on the discharge of the low pressure pump 43, and preventing the latter pump from building up an excessive pressure, especially during the rapid forward and reverse traverse portions of the operating cycle.

During the coarse and fine feed portions of the operating cycle, the passageway 194.1 is connected to the sump through its conduit 194.2, since, under these circumstances, this passageway is not covered by the land 196 of the directional valve 133 (Figs. 11 and 12) and the oil may escape therefrom to the sump through the passageway 198S. When the passageway 194.1 is thus connected to the sump, the valve 200 will, of course, be unbalanced and move outwardly to bypass the discharge of the low pressure pump 43 to the sump at a low pressure determined in part by the strength of the spring 202, and thus decrease the load on the pump driving motor during the feeding portions of the cycle.

High pressure relief valve

Means are provided to prevent the high pressure pump 72 from building up excessive pressures, this means comprising a high pressure relief valve, most clearly shown in Figs. 18, 19, and 20. Within the panel 96, there is a bore 214 having a liner 216. The liner 216 has external annular grooves 73.6 and 218S formed therein, the groove 73.6 being in communication with a cross drilled duct 73.5 which connects with the high pressure discharge conduit 73 through passageways 73.4 and 73.3 (Fig. 27), while the annular groove 218S communicates with the sump through elbow shaped passageway 218.IS. Freely slidable within the liner 216 is a cylindrical valve 220 having an annular external groove 73.91 formed therein, the outer portion 223 thereof forming a valve cooperable with ports 218.2S. Communication between the duct 73.5 and groove 73.91 is effected through a plurality of ports 73.8 formed in the liner 216.

The valve 220 is held in its lowermost position by a compression coil spring 224, the outer end of which abuts against a valve body 226 which is held against the end of the liner 216 by a sleeve 228 threaded in the outer end of the bore 214. A pilot valve 230 is guided for free reciprocation in bores formed in the valve body 226 and relief valve 220, respectively, this pilot valve 230 having an axially drilled passageway 73.9 which, through the bore 73.10 and port 73.11, is subjected to the pressure in the discharge conduit 73 of the high pressure pump. A throttling port 73.12 connects the outer end of the passageway 73.9 with the space 231 between the valve 220 and the valve body 226. The pilot valve 230 has longitudinal grooves or ports 232 formed therein, these grooves being adapted to connect the space 231 with a chamber 218.2S which, through a radial passageway 218.3S and an external longitudinal groove 218.4S connects with the annular groove 218S.

In operation, whenever the pressure of the discharge of the high pressure pump 72 becomes excessively high, the oil in the chamber 73.10 will force the pilot valve 230 outwardly against the force exerted by its spring 233, the degree of compression of which may be regulated by an adjusting screw 234 threaded in a plug 235 and covered by a cap nut 236. As the pilot valve is thus moved outwardly, its arcuate ports 232 will connect the space 231 with the chamber 218.2S, and thus permit the pressure in the chamber 231 to drop rapidly toward atmospheric pressure. The throttling port 73.12 is of considerably smaller cross sectional area than the combined cross sectional area of the ports 232 so that the oil does not flow through this throttling port in sufficient quantity to maintain the pressure in the chamber 231.

As a result of this reduction of the pressure in the chamber 231, the valve 220 will no longer be balanced, and the oil pressure on its inner end acting against the force of the spring 224 will cause the valve 220 to move outwardly rapidly, thus uncovering the ports 218.2S and permitting escape of the oil from the passageway 73.5 to the sump. This bypassing of the discharge of the high pressure pump will continue until the pressure drops sufficiently that the spring 233 may force the pilot valve 230 inwardly so as to cut off communication between the space 231 and chamber 218.2S via the arcuate ports 232. Under these circumstances, the oil continuing to flow through the throttling port 73.12 will, together with the spring 224, return the valve 220 to normal position, as shown in Fig. 18.

Coarse and fine feed controls

As previously stated, the rate at which the machine tool part is moved is determined by controlling the rate of flow of oil from the rod end of the actuating cylinder 29. The flow from this cylinder may be free for rapid forward traverse, may be restricted by an adjustable coarse feed valve for the coarse feed, or may be greatly restricted by the adjustable fine feed valve.

Thus, the rate at which the head is moved during the forward feeding portions of the cycle is determined by the rate at which oil may escape through a conduit 268 which is connected to the rod end of cylinder 29 (Figs. 26 and 27) and leads to a drilled passageway 268.1 formed in the control panel 96 (Fig. 14). The drilled passageway 268.1 intersects the directional valve cylinder 152 and has a sidewardly directed branch 268.2 which communicates with an annulus 268.3 formed in a feed governor valve sleeve 270 which is held in place in the panel 96 by an apertured plate 272. The valve sleeve 270 has a cylindrical bore 274 formed therein to receive the stem 276 of the governor valve, the stem 276 being formed integrally with a piston portion 278 which is guided in the bore 280 in which the sleeve 270 is fitted. The piston 278 and its stem 276 are pressed downwardly by a compression coil spring 282, the upper end of which is received in a socket formed in a removable plug 284 secured in the panel 96. The stem 276 has an axially drilled hole 286S by which the space in the bore 280 above the piston is at all times in free communication with the sump through the aperture 288S formed in the securing plate 272.

Stem 276 has a pair of arcuate slots 290 formed therein to form passageways for oil around an annular valve seal 292 formed on the sleeve 270, and thus permit flow of oil from the annulus 268.3, ports 268.4 and chamber 268.5 through the slots 290 into a chamber 294 which is the part of the bore 280 between the piston 278 and the upper end of the sleeve 270. It will be understood that the valve stem 276 is normally in the position in which it is shown in Fig. 14, but that, should the pressure within the chamber 294 become built up to a value sufficient to cause a piston 278 to compress the spring 282, the piston 278 and the stem 276 will move upwardly, thus partially closing the ports formed by the arcuate slots 290. These parts thus act as a governor to prevent the pressure within the chamber 294 from exceeding a predetermined value, such, for example, as 20 pounds per square inch.

The rate at which oil may escape from the chamber 294 determines the speed at which the cylinder 29 will move during the coarse feed and fine feed portions of the operating cycle. For the purpose of controlling the rate at which the oil may escape from this chamber 294 for the coarse feed portion of the cycle, an adjustable coarse feed valve 296 is provided. This valve is rotatable in a bore 298 and is non-rotatably secured to a control knob 300 which has a pointer on its base flange 302 for cooperation with graduations and indicia etched or otherwise marked upon a plate 304 (Fig. 2). The valve 296 is held within its bore by a bushing 306 and has an arcuate V-shaped groove 308 of gradually tapering depth formed along a portion of its periphery for registration with a passageway 294.1 leading to the chamber 294.

The deeper end of the V-shaped groove 308 communicates with an axially drilled hole 310 formed in the valve 296 through a radially drilled port 310.1. It will be understood that as the valve 296 is rotated, the cross sectional area of that portion of the groove 308 which is adjacent the passageway 294.1 may be varied, and since it is mainly that portion of the groove 308 of least cross sectional area which determines the rate at which oil will flow from the passageway 294.1 to the drilled hole 310, the angular position of the valve 296 effectively determines the rate at which the oil may escape from the rod end of the cylinder 29—provided the oil may flow freely from the drilled hole 310 of the valve 196.

In the coarse feed position of the directional valve 133, the oil flowing from the drilled hole 310 may flow with a minimum of resistance to the sump through a passageway 310.2 which communicates with a duct 310.3 and from the latter duct through the directional valve to the sump, as will appear hereinafter.

When the directional valve is in position for completing the fine feed portion of the machine cycle, the duct 310.3 is blocked, as will be described hereinafter, and the oil in the passageway 310.2 thus flows through the connecting passageway 310.4 to the fine feed adjusting valve 312 which is rotatable in a valve cylinder 314 formed in the panel 96.

The valve 312 is of substantially the same construction as the valve 296, although its V-shaped restriction groove 316 may be cut less deep than the corresponding groove 308 of the valve 296.

The valve 312 has a control knob 318 secured thereto, this valve having a pointer cooperable with graduations and indicia formed upon a plate 320 which is suitably secured to the panel 96, (Fig. 2), the valve being held in position by a bushing 322 threaded or otherwise suitably secured in the panel 96. The valve 312 has a port 324S communicating with an axially drilled passageway 325S which is in open communication with a passageway 326S leading to the sump. It will be understood that the sump is located directly inside of the panel 96 so that any passageways, such as the passageway 326S, which extend to the inner surface of the panel 96, discharge into the sump.

From the foregoing, it will be seen that when the passageway 310.3 is blocked by the directional valve, the oil from the rod end of the cylinder 29, after flowing through the governor valve 276, must flow successively through the flow restricting valves 296 and 312, which constitute, respectively, the adjustable valves for coarse feed and fine feed portions of the operating cycle.

*The directional control valve*

The directional control valve 133, as previously described, is reciprocable in a cylinder 152, the head ends 328 and 330 forming in effect pistons for reciprocation of the valve. The valve has annular passageways 332, 334, and 336 which are adapted to interconnect certain of the annular grooves formed in the cylinder 152.

Oil under pressure from the conduit 73 is supplied through a passageway 73.1 and chamber 73.2 to an annulus 73.7. The previously described drilled passageway 268.1 communicates with an annular groove 268.6 formed in the wall of the cylinder 152. Passageways 338S and 340S, communicating respectively with annular grooves 339S and 341S, discharge directly into the sump.

A conduit 342 connected to the forward end of the cylinder 29 leads to a drilled passageway 342.1 which communicates with an annular groove 342.2 formed in the walls of the cylinder 152. The passageway 310.3 previously described in connection with the operation of the fine feed control valve communicates with an annular groove 310.5 formed in the wall of the cylinder 152.

*Operation of directional valve*

As previously described, the position of the directional valve is quickly and accurately determined by the position of either the automatic pilot valve 104 or the position of the hand pilot valve 103, depending upon the position of the throw-over valve 102. The functions of the directional valve 133 will first be described with reference to Fig. 9, in which this valve is in its "stop" or "neutral" position. Under these circumstances, it will be noted that the oil under pressure supplied to the annular groove 73.7 flows freely, via the annular passageways 334 and 336 to the passageway 340S to the sump. While both ends of the cylinder 29 are also in communication with the oil pressure supply (via 73, 73.1, 73.7, 334, 342.2, 342.1, and 342, and via 73, 73.1, 73.7, 334, 268.6, 268.1, and 268), the pressure in the cylinder will be negligibly low because both ends are connected to the sump through passageway 340S. Thus, even though the piston is of the usual differential type, no motion of the cylinder and machine tool head will take place.

It will thus be seen that the discharge of both the low pressure pump 43 and that of the high pressure pump 72 will be vented to the sump whenever the head is in neutral or stop position. The only restrictions in the flow from the low pressure pump are afforded by the pressure maintaining valve 74 and check valve 190, whereas there is no material restriction in the flow from the high pressure pump 72 to the sump. Thus, the load on these pumps is reduced to a minimum while the head is in neutral or stop position, with consequent low power consumption, and the oil is not unnecessarily heated, as it would be if the pressures were relieved through the low pressure relief valve of Fig. 21 and the high pressure relief valve of Fig. 18.

In the normal cycle of operations, upon energization of solenoid 169, the first movement of the directional valve 133 will be from its stop position (Fig. 9) through its fine feed position (Fig. 12) and coarse feed position (Fig. 11) to its rapid forward traverse position (Fig. 10). Although this movement of the directional valve through the fine feed and coarse feed positions is so rapid, when the automatic control is used, that the movement of the valve through these two feed positions has no noticeable effect upon the actuation of cylinder 29, the operation of the directional valve during this portion of its cycle will be described as if this first movement of the directional valve and of the pilot valve took place slowly, as when the throw-over valve is positioned for hand control, and the hand pilot valve is moved slowly through its successive positions.

It will be noted that when the directional valve 133 is in the fine feed position shown in Fig. 12, the oil under pressure supplied through the passageway 73.1 flows through the annular groove 73.7 around the annular passageway 334 to the passageway 342.1 and hence to the left-hand (Fig. 26) or forward end of cylinder 29 tending to cause the cylinder 29 to move to the left. At the same time, oil will be forced outwardly from the right hand end of the cylinder 29 through conduit 268 through passageway 268.1 and annular groove 268.6, but cannot flow toward the exhaust passageway 340S because the annular groove 268.6 is blocked by the directional valve. The oil, since it cannot escape from the annular groove 268.6, must flow through the passageway 268.2 through the feed governor valve mechanism 276, 278, through the passageway 294.1 and coarse feed control valve 296 to the passageway 310.2.

It will be noted from Fig. 12 that the passageway 310.3 is closed so that the oil cannot escape therethrough, leaving the passageway 310.4 and fine feed control valve 312 as the only avenue through which the coil can flow to the sump from the rod end of the cylinder 29. By proper adjustment of the fine feed control valve 312, the rate at which the oil thus escapes from the rod end of the cylinder 29 to the sump may be accurately regulated to secure substantially any desired slow feed rate.

The second passing phase of the operating cycle of the directional valve, although of negligibly short duration, comprises its movement to coarse feed position, as shown in Fig. 11. In this figure, the supply of oil flows from the passageway 73.1 to the forward end of the cylinder 29 through the conduit 342, etc., in the same manner as described with reference to Fig. 12. The flow of oil from the rod end of the cylinder 29 through the conduit 268 is still prevented from passing to the sump S along the valve from the annular groove 268.6 by the directional valve, and therefore continues to flow as in the fine feed position through the feed governor and through passageway 294.1, to the coarse feed control valve 296, and hence to the passageway 310.2. It will be noted from Fig. 11 that the duct 310.3, which is in open communication with the passageway 310.2, is partially uncovered by the directional valve 133 so that oil may flow from the annular groove 310.5 through the annular passageway 336 to the annular groove 341S and hence through the passageway 340S to the sump. Thus, the sole means for controlling the rate at which the cylinder 29 may move is the coarse feed control valve 296 with, of course, the intermediate control effected by the feed governor valve 276.

In Fig. 10, the directional valve 133 is illustrated in the position it assumes to cause rapid forward traverse of the head of the machine tool or rapid forward movement of the cylinder 29. When in this position, it will be apparent from an inspection of Fig. 10, the oil under pressure supplied through the duct 73.1 flows through the annular groove 73.7, annular passageway 334 to the annular groove 342.2, passageway 342.1, and conduit 342, and hence to the forward end of the cylinder 29. The rod or right-hand end of cylinder 29 is vented to the sump through a hydraulic circuit including the conduit 268, passageway 268.1, annular groove 268.6, annular passageway 332 on the valve 133, annular groove 339S and passageway 338S.

It will be noted that in Fig. 10, the directional valve 133 is at the right-hand end of its stroke, in the position it is forced to assume by the hydraulic motor when the solenoid 169 has been actuated, as shown in Fig. 23. In this position, the automatic pilot valve 104 has been moved clockwise to the limit of its oscillatory stroke.

In the normal sequence of the cycle of operations, the rapid forward traverse, as determined by the directional valve when it is in the position of Fig. 10, is followed by the coarse feed forward operation when the directional valve is moved to the position in which it is shown in Fig. 11 to control hydraulic circuits previously described as effective to cause the coarse feeding portion of the operating cycle of the machine. Thereafter, the directional valve 133 is moved to fine feed position, as shown in Fig. 12 and as above described with reference to said figure.

Upon completion of the fine feeding portion of the operating cycle, the solenoid 168 is energized to cause the hydraulic motor to move the pilot valve, and hence the directional valve, through stop or neutral position (shown in Fig. 9 and above described with reference thereto) to rapid reverse position. Under these circumstances, the hydraulic motor parts will be in the positions in which they are shown in Fig. 24.

For the rapid reverse traverse, the directional valve 133 is thus moved to its leftmost position, as shown in Fig. 13. When in this position, the following hydraulic circuits are completed. Oil under pressure supplied to the passageway 73.1 flows through the connected annular groove 73.7 around the annular passageway 334 of the directional valve and through annular groove 268.6, passageway 268.1 and conduit 268 to the rod end of the cylinder 29, thus applying pressure to the of the cylinder piston and cylinder tending to move the cylinder 29 to the right (Fig. 26). Oil from the forward end of cylinder 29 may escape to the sump through conduit 342, passageway 342.1, annular groove 342.2, annular passageway 336, around directional valve 133, annular groove 341S and passageway 340S. It will be noted that the flow of oil into the rod end of cylinder 29 from the supply conduit 73 is unrestricted (except by the valves 74 and 190), and similarly, that the flow of oil from the forward end of cylinder 29 to the sump is likewise substantially unrestricted. As a result, the cylinder 29 and the machine tool head will move rapidly in a reverse direction.

After the completion of the rapid reverse traverse of the machine tool head, the directional valve will, of course, be returned to its neutral or stop position shown in Fig. 9.

*Operation*

In the foregoing description of the various parts of the invention, the operation of these parts has been set forth in considerable detail, so that it is believed that a brief general description of the operation of the machine as a whole, correlating the previous description of the various operations performed by the individual parts, will suffice.

Assuming that a work piece 40 has been secured in position upon the table 38 and that the tools 31 are such as require the cycle of feeding operations previously described, the operator will press push button 61 to energize the electric motor 28, causing rotation of the tools 31 and the operation of the pumps 43 and 72 to build up suitable operating pressures in the conduits 90 and 73. Thereafter, the operator will press push button 59 to close switch 59a energizing solenoid 169 which, through the operation of the hydraulic motor, as previously described, causes movement of the pilot valve 104 to rapid forward traverse position.

In order to get to rapid forward traverse position from the neutral or stop position in which the valve 104 was assumed to be positioned, the valve must successively pass its fine feed and coarse feed positions. Correspondingly, the directional valve 133, in order to move from its stop position of Fig. 9 to its rapid forward traverse position of Fig. 10, must pass through the fine feed and coarse feed positions of Figs. 12 and 11, respectively. However, its movement from stop or neutral position to its rapid forward traverse position is continuous, and the only effect of the valve 133 passing through its fine feed and coarse feed positions is to decrease slightly the suddenness with which the oil under pressure is applied to the forward end of the cylinder 29, or more exactly, the suddenness with which the oil pressure in the rod end of the cylinder 29 is relieved.

After the head of the machine tool has thus been moved rapidly to the position at which the tools 31 are about to engage the work, the lower end of arm 44 strikes the dog 46 and is raised thereby, thus, through the link 52 and arm 50 swinging the automatic pilot valve 104 counter-clockwise (Figs. 1, 2, 4, 5, and 6) to a position such that the directional valve 133 will be moved to its coarse feed position shown in Fig. 11. Under these conditions, the rate at which the head will be moved forwardly will be determined by the rate at which the oil in the rod end of cylinder 29 may escape to the sump through the feed governor valve 276 and the coarse feed governor valve 296.

It will be understood that the rate at which oil will flow through a restricted passageway or orifice depends upon the differential pressure involved, as well as upon the size of the passageway or orifice. Since the size of the passageway through the coarse feed valve 296 does not vary after it has been adjusted to the desired position, it is necessary to maintain uniformly the differential pressure upon opposite sides of this orifice or passageway, and this is accomplished with a very high degree of accuracy by the feed governor valve 276, since any slight increase in pressure in the chamber 294 of the feed governor valve results in upward movement of the valve 276 and consequent restriction of the flow of oil into the chamber 294 until the pressure in the latter chamber again drops to the predetermined value.

After the head of the machine tool has thus been controlled for the coarse feed portion of its cycle, the lower end of the arm 44 will engage the dog 47 (Fig. 1) and swing further counter-clockwise, thereby to shift the automatic pilot valve 104, and hence the directional valve 133 to their respective fine feed positions. It will be recalled that when the directional valve 133 is in its fine feed position, the passageway 310.3 from the coarse feed control valve 296 is blocked so that the only pathway for the escape of oil from the rod end of the cylinder 29 is through both the coarse feed valve 296 and through the fine feed valve 312.

Due to the greater restrictions offered to the flow of oil through this path, the amount of the restriction depending principally upon the adjustment of the fine feed valve 312, the head of the machine tool will be moved forwardly at a very slow rate which is predetermined to correspond with the desired feed rate of the tools 31 into the work piece 40.

After the tools have completed their respective operations upon the work piece, the limit switch actuator 66 will engage the limit switch dog 68 and thereby close the limit switch 64a. The closure of this switch will result in energization of the solenoid 168 which, through the hydraulic motor, will swing the automatic pilot valve 104 counter-clockwise to rapid reverse position, with consequent movement of the directional valve 133 to its rapid reverse traverse position, as shown in Fig. 13.

It will be noted that in order to move from its fine feed position to its rapid reverse traverse position, the directional valve 133 must move through its stop position.

The rapid reverse traverse portion of the operating cycle is arrested by engagement of the downwardly projecting arm 44 with the dog 45, the shape of the part of the dog 45 engaged by the end of the arm 44 being such as accurately to locate this arm in a position such that the automatic pilot valve 104, and consequently the directional valve 133, are accurately moved to their respective stop or neutral positions. The head will therefore come to rest and the operator may then remove the work piece 40 from the table 38 and replace it with another piece to be machined.

If, during any part of the cycle of operations, a tool should break or for any other reason the operator considers it undesirable for the machine to complete its normal cycle of operations, the operator will press the push button 60, thus closing the switch 60a, and initiating a rapid traverse movement of the head, irrespective of the position of the head at the time (assuming that it is not in its fully retracted stop position).

The operation above has been described on the assumption that the handle 56 is in its upper or automatic control position with the hand pilot valve 103 locked in position by the locking pin 111. When setting up the tools, or whenever any adjustment thereof is required, it is desirable that the head of the machine tool be subject to hand control. This shift from automatic to hand control is accomplished by clockwise swinging movement of the handle 56 which moves the throw-over valve 102 from the position in which it is shown in Fig. 7 to the position in which it is shown in Fig. 8. Whenever this is done, the handle 54 must, of course, be in neutral or stop position, because it is always held in this position by the locking pin 111, and therefore movement of the head of the machine tool cannot result from merely shifting the handle 56 from automatic control position to hand control position, but if the head is in motion at the time the shift from automatic to hand control is made, the head will of course come to rest.

After such shift of the handle 56 has been effected, the hand pilot valve 103 assumes control of the position of the directional valve 133 by virtue of the change-over effected by the throw-over valve 102. As a consequence, the directional valve may be moved to any one of its five positions merely by swinging the handle 54 to the desired position. When the throw-over valve handle 56 is in the hand control position, the movement of the arm 44 by the dogs 45, 46, and 47 will not have any effect, nor will the limit switch 64a have any effect upon the movement of the tool head. Thus, the handle 54 may be moved to position to cause any desired movement of the head of the tool. For example, during the setting up of the machine, the handle 54 may be moved to the fine feed position and the head made to move very slowly through any desired distance so that adjustments of the positions of the tools and of the dogs 45, 46, 47, and 68 may be made conveniently and accurately.

The fact that the machine tool head will always come to rest when the handle 56 is swung from automatic to hand position is an advantageous feature since the handle 56 may be moved in this manner as a convenient method of quickly stopping movement of the head. It will be understood, from the above description, that the hand controlled pilot valve is locked in its neutral or stop position whenever the handle 56 is in automatic control position. Thus, upon shifting this handle from automatic to hand control position, the hand controlled pilot valve immediately causes the directional valve to move to stop position, irrespective of its previous position.

Furthermore, when the hand controlled pilot valve is in use to direct the hydraulic traverse means, the automatic pilot valve is nevertheless moved by the cams or dogs 45, 46, and 47 and the hydraulic motor controlled by the solenoids 168 and 169 so that it is at all times in the position necessary to resume control at the proper point in the cycle. This is important in setting up because the operator can, using the hand control, cause the machine head to rapidly traverse forwardly past the feed cam or cams and then stop the traverse, re-position the feed cam or cams, change to automatic control, and the machine head will then resume the automatic cycle in feed traverse.

Some installations of the hydraulic control apparatus of our invention may be provided with solenoids for moving the lever 56 from hand to automatic position and vice-versa. By such means, utilizing dog operated limit switches or other types of limit switches to control these solenoids, a machine head could be made to have a stop position in the middle of a cycle. For example, the cycle might be: Rapid forward traverse; feed forward; stop (caused by a dog and limit switch controlled solenoid shifting the lever 56 from automatic to hand position); feed forward (caused by a push button switch controlled solenoid returning the lever 56 to automatic control position); reverse; and stop. It will be understood that such functioning of the apparatus would be possible because when the lever 56 is shifted to hand control position the directional valve 133 is immediately actuated to stop position, but the automatic pilot valve 104 remains in feed position, so that when the lever 56 is moved back to automatic position, the directional valve will be moved back to the feed position or other position in which it was located before the change of the position of the lever 56 was made.

It should be clearly understood that while the operator is controlling the position of the machine head by the handle 54, the automatic pilot valve 104 is moved by the engagement of the dogs 45, 46, and 47 with lever 44, and by the hydraulic motor controlled by solenoid 169, the circuit for which is completed by the limit switch 64a. This movement of the automatic pilot valve 104 depends solely upon the position of the machine tool head with respect to the dogs. However, the automatic pilot valve is ineffective until the handle 56 is again shifted to the automatic position.

Upon completion of the day's operations, the operator will press the push button 62 which opens switch 61a and stops the motor 28. If desired, such operation of the push button 62 may also be made to de-energize the circuit which supplies electric power to the solenoids 168 and 169 either directly or through a suitable relay.

It will be noted that the bores in which the various valves are mounted all extend to the front surface or one of the end surfaces of the panel 96 and that by removal of suitable bushings holding the valves in place and sealing the ends of these bores, the valves may readily be removed for inspection, cleaning, or replacement. Thus, substantially all of the parts of the hydraulic control mechanism are accessible without removing the panel 96 from the housing 25. Furthermore, practically all of the various passageways and ducts by which the various valves are interconnected, are formed by holes drilled in the panel itself, so that very little piping external to the panel is required.

Since the rear face of the panel is directly above the sump within the housing 25, such passageways as lead to the sump (e. g. 338S, 340S and 326S require no connections. In addition, it will be noted that the passageways connecting the various valves are very short and have very few bends therein, so that they offer relatively little frictional resistance to the rapid flow of the oil between the valves. As a result, the operation of the various valves is extremely rapid.

By virtue of the use of the hydraulic motor for rotating the automatic pilot valve 104, the solenoids 168 and 169 for actuating the slide valves 170 and 171 may be made very small, since the slide valves 170 and 171 are of small diameter and control the flow of oil under relatively low pressure. The system may thus be compared with a cascaded vacuum tube amplifier in which the input is the electrical energy supplied to the solenoids and in which the hydraulic motor, the automatic pilot valve, and the directional valve, correspond to successive stages of amplification, resulting in the power output utilized to move the cylinder 29 and the machine tool head to which the latter is connected. By thus increasing the power available through a number of power multiplying steps, the individual parts of the system may be made small and compact, and a minimum of energy is required to initiate a train of operation of these parts. This successive power multiplying arrangement (of solenoid, hydraulic motor, pilot valve, directional valve, and power cylinder and piston) is also of advantage in making possible very rapid changes in the positions of these parts between successive portions of the operating cycle.

Due to the sequence of the portions of the cycle whereby the directional valve must move through stop position before being moved to reverse position, and can only be moved from reverse position to another position by passing through the stop position, the possibility of jarring the machine head by having the directional valve pass through reverse traverse position as an incident to passing from stop to forward traverse position, is avoided, with resultant elimination of undesirable jaring of the tool carrying head.

Another important advantage of the control apparatus of our invention is the fact that the discharge from the low pressure pump 43 is automatically bypassed to the sump during the fine feed and coarse feed portions of the cycle, as is accomplished by the movement of the land 196 of the directional valve 133 from obstructing position over the end of the passageway 194.3, and permitting the oil to flow from the passage 194.3 to the sump through passageway 198.S whenever the directional valve is in coarse feed or fine feed positions. As previously pointed out, when the pressure in passageway 194.3 is thus relieved, it relieves the pressure in the chamber above the low pressure relief valve 200 (through conduit 194.2 and passageway 194.1), thereby freely venting the low pressure pump to the sump.

Thus, the low pressure pump 43 is under appreciable load (other than the load imposed by the pressure maintaining valve 84) only during the rapid forward and rapid reverse portions of the cycle, and during these latter portions of the cycle, the discharge of the low pressure pump flows past the check valve 190 into the high and low pressure mixing chamber 73.2 so that the discharges of both the high pressure pump 72 and the low pressure pump 43 are combined to assure that the rapid reverse traverse portions of the cycle will take place at high speed.

At the same time, the high pressure capable of being developed by the pump 72 is at all times available during the rapid forward and rapid reverse traverse portions of the cycle, to cause movement of the machine tool head, should this become necessary. Under the latter circumstances, the pressure in the mixing chamber 73.2 may build up to a value higher than that capable of being developed by the low pressure pump 43, and consequently, the check valve 190 will remain in closed position and the head moved solely due to the discharge of the high pressure pump 72 until such time as the resistance to its movement is lessened to the extent that the pressure developed by the low pressure pump 43 at the check valve 190 is sufficient to move the head.

The hydraulic control apparatus disclosed in this application constitutes an improvement upon the apparatus disclosed in the co-pending application of Robert A. Schafer and Ralph Rodal, Serial No. 291,656, filed August 24, 1939. This application has matured into Patent No. 2,299,851 granted October 27, 1942.

While we have shown and described a particular embodiment of our invention, it will be apparent to those skilled in the art that various modifications may be made without departing from the underlying principle of our invention. We therefore desire, by the following claims, to include within the scope of our invention all such variations and modifications by which substantially the results thereof may be obtained by substantially the same means.

We claim:

1. In a hydraulic control system for machine tools in which a hydraulic pressure fluid supply under high pressure and at low volume is required during a portion of the operating cycle and a supply at low pressure and high volume is required during another portion of the operating cycle, the combination of a high pressure low volume pump, a low pressure high volume pump, means to drive said pumps continuously, a discharge conduit system for each of said pumps, a check valve connecting said conduit systems to permit flow from said low pressure pump into the conduit system for the high pressure pump and to prevent flow from the high pressure pump into the conduit system for the low pressure pump, a pressure relief valve connected to the conduit system of the low pressure pump to relieve the pressure therein when it exceeds a predetermined maximum value, and means operated during the portion of the cycle in which a high pressure low volume supply of hydraulic fluid is required to cause said pressure relief valve to relieve the pressure at a pressure substantially lower than said predetermined maximum value.

2. In a hydraulic control system for machine tools in which a hydraulic pressure fluid supply under high pressure and at low volume is required during a portion of the operating cycle and a supply at low pressure and high volume is required during another portion of the operating cycle, the combination of a high pressure low volume pump, a low pressure high volume pump, means to drive said pumps continuously, a discharge conduit system for each of said pumps, a pressure relief valve connected to the conduit system of the low pressure pump to relieve the pressure therein when it exceeds a predetermined maximum value, and means operated during the portion of the cycle in which a high pressure low volume supply of hydraulic fluid is required to cause said pressure relief valve to relieve the pressure at a pressure substantially lower than said predetermined maximum value.

3. In a hydraulically controlled and operated machine tool having a part to be moved at low speed against a high resistance and at high speed against a low resistance, the combination of a hydraulic motor for moving said part, a source of hydraulic fluid under low pressure, a source of hydraulic fluid under high pressure, a directional valve controlling the application of hydraulic fluid under pressure from said sources to said motor, a pressure relief valve connected to said low pressure source and normally operating to relieve the pressure when it exceeds a predetermined maximum value, and means controlled by said directional valve to cause said relief valve to operate to relieve the pressure at a pressure much lower than said predetermined maximum value.

4. In a hydraulic operating and control system for machine tools in which a hydraulic pressure fluid supply under high pressure and at low volume is required during a portion of the operating cycle and a supply at low pressure and high volume is required during another portion of the operating cycle, the combination of a high pressure low volume pump, a low pressure high volume pump, means to drive said pumps continuously, a discharge conduit system for each of said pumps, a check valve connecting said conduit systems to permit flow from said low pressure pump into the conduit system for the high pressure pump and to prevent flow from the high pressure pump into the conduit system for the low pressure pump, a hydraulic motor, a directional valve controlling the operation of said motor, a pressure relief valve connected to the conduit system of the low pressure pump to relieve the pressure therein when it exceeds a predetermined maximum value, and means operated by said directional valve, during the portion of the cycle in which a high pressure low volume supply of hydraulic fluid is required for said motor, to cause said pressure relief valve to relieve the pressure at a pressure substantially lower than said predetermined maximum value.

5. In a hydraulic control system for machine tools in which a hydraulic pressure fluid supply under high pressure and at low volume is required during a portion of the operating cycle and a supply at low pressure and high volume is required during another portion of the operating cycle, the combination of a high pressure low volume pump, a low pressure high volume pump, means to drive said pumps continuously, a discharge conduit system for each of said pumps, a check valve connecting said conduit systems to permit flow from said low pressure pump into the conduit system for the high pressure pump and to prevent flow from the high pressure pump into the conduit system for the low pressure pump, a pressure relief valve connected to the conduit system of the low pressure pump to relieve the pressure therein when it exceeds a predetermined maximum value, said pressure relief valve including a chamber and a pilot valve operating in response to the pressure in said chamber, and means operated during the portion of the cycle in which a high pressure low volume supply of hydraulic fluid is required to relieve the pressure in said chamber and thereby to cause said pressure relief valve to relieve the pressure at a pressure substantially lower than said predetermined maximum value.

6. In a hydraulic control and operating system for machine tools in which a hydraulic pressure fluid supply under high pressure and at low volume is required during a portion of the operating cycle and a supply at low pressure and high volume is required during another portion of the operating cycle, the combination of a high pressure low volume pump, a low pressure high volume pump, means to drive said pumps continuously, a discharge conduit system for each of said pumps, a passageway connecting said conduit system and having a check valve to prevent flow from the high pressure to the low pressure conduit system, a pressure relief valve connected to the conduit system of the low pressure pump to relieve the pressure therein when it exceeds a predetermined maximum value, apparatus for determining the cycle of operation of the system, and means operated by said apparatus during the portion of the cycle in which a high pressure low volume supply of hydraulic fluid is required to cause said pressure relief valve to relieve the pressure at substantially atmospheric pressure.

7. In a hydraulically controlled and operated machine tool having a part to be moved at low speed against a high resistance and at high speed against a low resistance, the combination of a hydraulic motor for moving said part, a source of hydraulic fluid under low pressure, a directional valve for controlling the admission of hydraulic fluid from said source to said motor during the portion of the cycle during which said part is to be moved at high speed against low resistance; a pressure relief valve for venting said source to substantially atmospheric pressure comprising, a plunger type valve reciprocable in a bore having its inner end freely connected to said source and having its outer end connected to said source through a restricted port, a spring pressed pivot valve effective to relieve the pressure at the outer end of said bore upon attainment of a predetermined maximum pressure therein, said pilot valve providing a discharge opening of substantially less resistance than said restricted port, a spring normally holding said relief valve closed, and additional means for venting the space at the outer end of said bore to substantially atmospheric pressure during that portion of the operating cycle of the machine tool part in which said part is to be moved at low speed against high resistance; a source of hydraulic fluid under high pressure, means including said directional valve for conducting the hydraulic fluid from said high pressure source to said motor for low speed operation thereof, and check valve means connecting said low pressure source to said high pressure source to permit the hydraulic fluid under low pressure to be connected with the source at high pressure when ever the resistance to movement of said motor is sufficiently low to enable it to be operated from said low pressure source.

ROBERT A. SCHAFER.
RALPH RODAL.